(12) United States Patent
Schwiebert et al.

(10) Patent No.: US 12,067,351 B2
(45) Date of Patent: Aug. 20, 2024

(54) SYSTEMS AND METHODS FOR EXTRACTING TEXT FROM PORTABLE DOCUMENT FORMAT DATA

(71) Applicant: Canva Pty Ltd, Surry Hills (AU)

(72) Inventors: Stephan Schwiebert, Sydney (AU); Velislava Yanchina, Byron Bay (AU); Henrry Eduardo Iguaro Jaramillo, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/682,718

(22) Filed: Feb. 28, 2022

(65) Prior Publication Data

US 2022/0284175 A1 Sep. 8, 2022

(30) Foreign Application Priority Data

Mar. 2, 2021 (AU) ................ 2021201352

(51) Int. Cl.
*G06F 17/00* (2019.01)
*G06F 40/166* (2020.01)
*G06F 40/205* (2020.01)
*G06F 40/279* (2020.01)
*G06V 30/10* (2022.01)
*G06F 40/10* (2020.01)

(52) U.S. Cl.
CPC .......... *G06F 40/166* (2020.01); *G06F 40/205* (2020.01); *G06F 40/279* (2020.01); *G06V 30/10* (2022.01); *G06F 40/10* (2020.01)

(58) Field of Classification Search
CPC ...... G06F 40/10; G06F 40/166; G06F 40/126; G06F 40/205; G06F 40/279; G06F 40/109; G06F 40/151; G06V 30/10; G06V 30/158; G06V 30/414
See application file for complete search history.

(56) References Cited

U.S. PATENT DOCUMENTS

| | | | | |
|---|---|---|---|---|
| 10,019,415 | B1 * | 7/2018 | Wombell | G06F 40/109 |
| 11,069,027 | B1 * | 7/2021 | Jain | G06T 3/60 |
| 2004/0004625 | A1 * | 1/2004 | Chao | G06F 40/103 |
| | | | | 345/622 |
| 2004/0145593 | A1 * | 7/2004 | Berkner | G06F 16/9577 |
| | | | | 345/619 |
| 2005/0193327 | A1 * | 9/2005 | Chao | G06F 40/166 |
| | | | | 715/256 |
| 2007/0002054 | A1 * | 1/2007 | Bronstein | G06V 30/414 |
| | | | | 345/472.3 |

(Continued)

OTHER PUBLICATIONS

Overlap; Jan. 13, 2021; merriam-webster.com; pp. 1-3.*

(Continued)

*Primary Examiner* — Andrew T McIntosh
(74) *Attorney, Agent, or Firm* — GrowIP Law Group LLC

(57) ABSTRACT

Described herein is a computer implemented method. The method includes accessing, by a computer system including a processing unit, portable document format (PDF) data defining a plurality of glyphs, sorting the plurality of glyphs into one or more glyph sets, and calculating an expanded glyph bounding box for each glyph. Each glyph set is processed to determine one or more text areas, each text area being associated with one or more glyphs from the glyph set which have collectively overlapping expanded bounding boxes.

19 Claims, 13 Drawing Sheets

(56) References Cited

U.S. PATENT DOCUMENTS

| | | | | |
|---|---|---|---|---|
| 2007/0250497 | A1* | 10/2007 | Mansfield | G06F 16/36 |
| | | | | 707/999.005 |
| 2008/0238927 | A1* | 10/2008 | Mansfield | G06T 11/60 |
| | | | | 345/467 |
| 2010/0174985 | A1* | 7/2010 | Levy | G06F 40/106 |
| | | | | 715/244 |
| 2012/0102388 | A1* | 4/2012 | Fan | G06F 40/151 |
| | | | | 715/234 |
| 2013/0174017 | A1* | 7/2013 | Richardson | G06F 40/10 |
| | | | | 715/234 |
| 2015/0056596 | A1 | 2/2015 | Bercovitz et al. | |
| 2015/0347356 | A1* | 12/2015 | Beaver | G09G 5/26 |
| | | | | 345/472 |
| 2016/0028921 | A1* | 1/2016 | Thrasher | H04N 1/40012 |
| | | | | 358/519 |
| 2017/0132484 | A1* | 5/2017 | Malon | G06V 30/153 |
| 2018/0218523 | A1* | 8/2018 | Dhanuka | G06T 11/60 |
| 2019/0272438 | A1* | 9/2019 | Liu | G06N 3/045 |
| 2020/0005033 | A1* | 1/2020 | Bellert | G06F 16/93 |
| 2020/0026749 | A1* | 1/2020 | Karlapudi | G06F 40/106 |
| 2020/0302208 | A1* | 9/2020 | Hoehne | G06N 20/00 |
| 2021/0081493 | A1* | 3/2021 | Arora | G06F 3/0482 |
| 2021/0090308 | A1* | 3/2021 | Kumawat | G06T 3/0093 |
| 2021/0118207 | A1* | 4/2021 | Kumawat | G06V 30/245 |
| 2021/0248303 | A1* | 8/2021 | Sirangimoorthy | G06F 40/106 |
| 2021/0248420 | A1* | 8/2021 | Zhong | G06F 16/93 |
| 2021/0278958 | A1* | 9/2021 | Dubey | G06F 3/04842 |
| 2022/0036611 | A1* | 2/2022 | Nykyforov | G06V 10/993 |
| 2022/0130085 | A1* | 4/2022 | Kumawat | G06F 40/103 |

OTHER PUBLICATIONS

Overlap; Nov. 17, 2019; vocabulary.com; pp. 1-2.*

Overlap; Jan. 13, 2021; merriam-webster.com; pp. 1-5.*

Clausner, Christian, Stefan Pletschacher, and Apostolos Antonacopoulos. "Aletheia—an advanced document layout and text ground-truthing system for production environments." 2011 International Conference on Document Analysis and Recognition. IEEE, 2011 (Year: 2011).*

Goodman, Michael Wayne, Ryan Georgi, and Fei Xia. "to-Text Reanalysis for Linguistic Data Mining." Proceedings of the Eleventh International Conference on Language Resources and Evaluation (LREC 2018). 2018 (Year: 2018).*

Yuan, Bo, Leong Keong Kwoh, and Chew Lim Tan. "Finding the best-fit bounding-boxes." Document Analysis Systems VII: 7th International Workshop, DAS 2006, Nelson, New Zealand, Feb. 13-15, 2006. Proceedings 7. Springer Berlin Heidelberg, 2006 (Year: 2006).*

Medhi Moushumi et al: "A Text Recognition Augmented Deep Learning Approach for Logo Identification", Oct. 21, 2017 (Oct. 21, 2017), SAT 2015 18th International Conference, Austin, TX, USA, Sep. 24-27, 2015; [Lecture Notes in Computer Science; Lect.Notes Computer], Springer, Berlin, Heidelberg, pp. 145-156, XP047451619, ISBN: 978-3-540-74549-5.

* cited by examiner

SYSTEMS AND METHODS FOR EXTRACTING TEXT FROM PORTABLE DOCUMENT FORMAT DATA

CROSS-REFERENCE TO RELATED APPLICATION

This application is a U.S. Non-Provisional Applications that claims priority to Australian Patent Application No. 2021201352, filed Mar. 2, 2021, which is hereby incorporated by reference in its entirety.

FIELD

The present disclosure is directed to systems and methods for extracting text from portable document format data.

BACKGROUND

The portable document format (PDF) is a commonly used format for storing, communicating, and displaying documents that include (for example) text and images.

While useful for displaying documents, the nature of PDF is such that editing documents encoded as PDF data can become complex and unwieldy.

This becomes an issue when a user wishes to import PDF data—whether an entire PDF document, a single page of a PDF document, or an arbitrary selection of content from a PDF document—into an editor with a view to editing that data. At this point the original PDF data format will often not be at all conducive to being edited in an efficient or intuitive way.

Furthermore, while PDF may be an efficient format for storing and processing content that is to be viewed, where content is to be edited PDF may not be the most efficient format for either document size (and, therefore, the memory required for the document) and/or processing (i.e. computational resources required to render and permit editing of the document).

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

In one aspect, the present invention provides a computer implemented method including: accessing, by a computer system including a processing unit, portable document format (PDF) data defining a plurality of glyphs; sorting, by the processing unit the plurality of glyphs into one or more glyph sets; calculating, for each glyph, an expanded glyph bounding box; processing each of the one or more glyph sets to determine, for each glyph set, one or more text areas, each text area being associated with one or more glyphs, and wherein processing a given glyph set to determine one or more text areas includes: identifying distinct groups of glyphs from the particular glyph set, each distinct group of glyphs including one or more glyphs from the particular glyph set which have collectively overlapping expanded bounding boxes; and associating each distinct group of glyphs from the given glyph set with a separate text area.

BRIEF DESCRIPTION OF THE DRAWINGS

Preferred embodiments of the invention will be described, by way of examples only, with reference to the accompanying representations, wherein.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The Portable Document Format (PDF) is a common format for storing and sharing content. The PDF is standardised and described in ISO 32000 (e.g. ISO 32000-2). In many situations users may wish to import content formatted as PDF data into an editing application so that content can be edited. Typically, however, the PDF in its native format is not conducive to editing.

Figure 1:
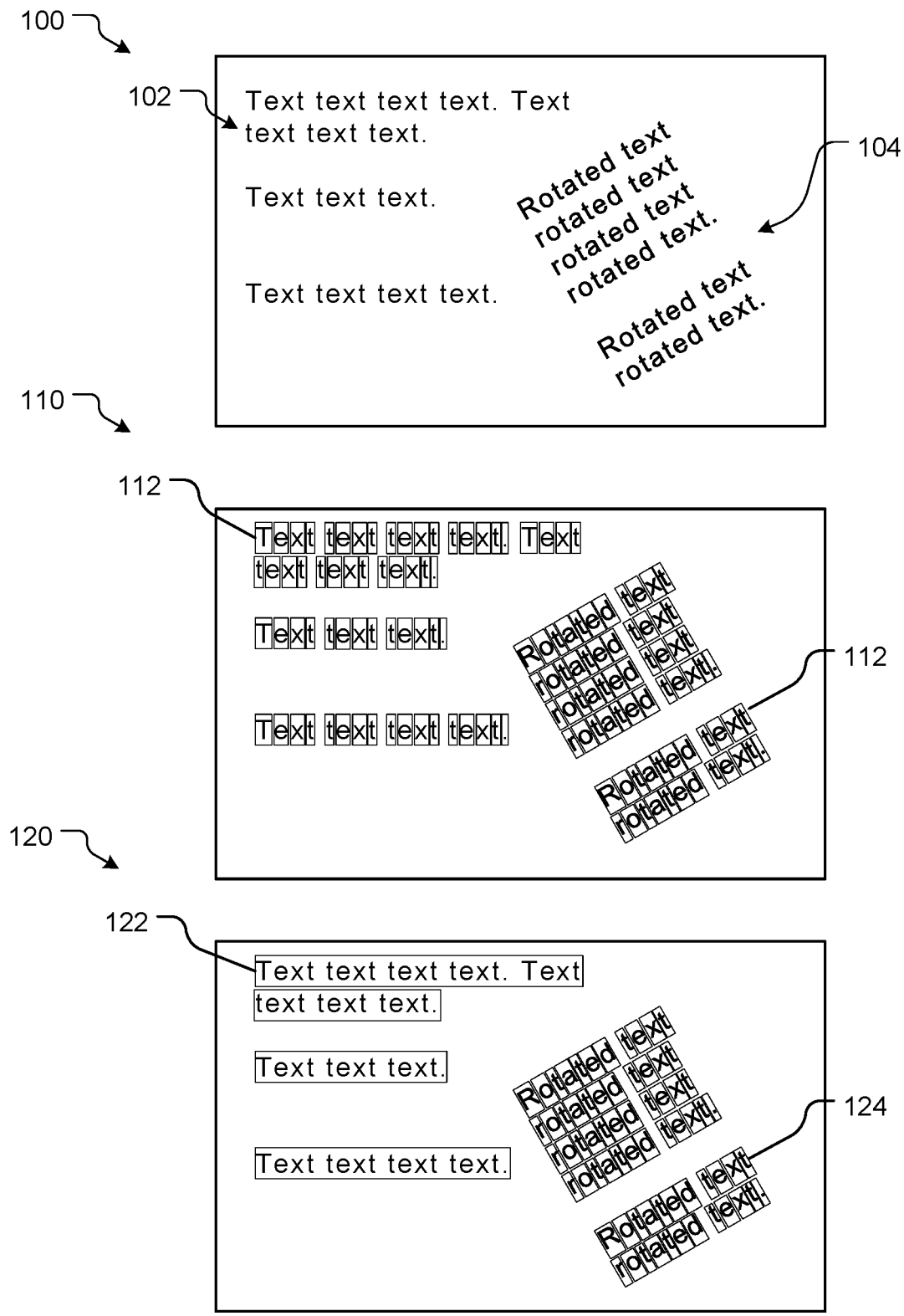
FIG. 1 depicts example pages with text data.

Consider, for example, the partial PDF page 100 of FIG. 1. Page 100 includes horizontal text (generally indicated by reference 102) and rotated text (generally indicated by reference 104). Although the horizontal text 102 and rotated text 104 will each have been originally generated as a single paragraph, the PDF is such that each text character (from both the horizontal and rotated text) is stored as an individual glyph or grapheme cluster.

As a result much of what will be referred to as the contextual data concerning the text is lost in the PDF—for example lines/line breaks, paragraph/paragraph breaks, empty lines etc.

If a user imports the PDF data of page 100 into an editing application the result will depend on how the application in question processes the PDF data.

To illustrate the types of issues that can arise when importing PDF data for editing, page 110 illustrates an example where the editing application has imported the text of page 100 without any (or only minimal) processing. This has resulted in each text character of the text being treated as an individual text element as indicated by bounding boxes 112.

From a user perspective this provides an extremely inefficient and frustrating editing experience. If a user wishes to edit any of the text individual elements must be manipulated. For example if a user wished to change one of the 'text' words to 'tax' they would need to select the relevant 'e' text element and amend it to the letter 'a' then select the relevant T text element and delete it. Following this the user may then want to address the additional space created by deleting the T text element, which would involve selecting all following text elements and adjusting their positions. Clearly this is not desirable.

As discussed further below, creating a separate text element for each individual character may also be sub-optimal from a memory and processing resources perspective.

Page 120 of FIG. 1 provides an alternative example of how an application could, potentially, create text elements when importing the PDF data of page 100. In page 120, the application in question has processed the PDF glyphs and created individual text elements 122 that each correspond to a line of the original horizontal text 102 (each character of the original rotated text 104 has, however, still been created as an individual text element 124). While this is an improvement over a process that creates a separate text element for each individual letter it still leaves much to be desired.

Aspects of the present disclosure are generally directed to improved (or at least useful alternative) systems and methods for extracting text from PDF data.

The techniques and features of the present disclosure will be described in the context of importing PDF data into an editable document. The editable document may be any appropriate editable document, for example a design document (rendered and edited by a design application), a word processing document (rendered and edited by a word processing application), or any other appropriate document type.

Initially, an example editable document format is provided. An example environment and a computer processing system which can be configured to perform the features described herein are then described. Various operations for extracting text from PDF data are then described.

Various editable document formats are possible, and these will vary depending on the type of document in question. This section describes an example editable document format that is used throughout this disclosure. Alternative editable document formats are, however, possible, and the processing described herein can be adapted for alternative formats.

In the present context, the editable document may be made up of a number of pages. Each page defines an area that is intended to be viewed as a discrete whole. A page will have certain page attributes, for example a page identifier, a page width, and a page height.

A page has an associated coordinate system (typically a common coordinate system provided by the design tool for all pages). In the present disclosure, the page coordinate system is a Cartesian coordinate system defining a horizontal (x) axis (with values increasing from left to right) and vertical (y) axis (with values increasing from top to bottom). It is noted, however, that in the PDF coordinate system y coordinates increase from bottom to top.

A page (e.g. the page identifier) is associated with a list (or array, tree, or other data structure) of document elements.

In the present example page (and element data) is stored in a device independent document descriptor. By way of example, a document descriptor may be stored in a JSON format file such as the following:

```
{
    "design": {
        "id": "ab120223",
        "creationDate": "1-jun-2020",
        "dimensions": {
            "width": 1080,
            "height": 1080
        },
        "elements": [
            {...},
            {...},
            ...
            {...}
        ],
    }
}
```

In this example, the design descriptor includes design metadata (e.g. a design identifier, a design creation date, and page dimensions (a height and a width) and an array of element descriptors in respect of elements that have been added to the page (described below).

Document elements (elements for short) are objects that are added to a page. Elements may imported (for example from PDF documents/data). Elements can also be drawn or created using one or more design tools (e.g. text/line/rectangle/ellipse/curve/freehand and/or other design tools).

An element that has been added to a page (and added to the page's element list) may be identified in various ways. For example, an element may be identified by its position (index) in the element list. Alternatively (or in addition) an element may be assigned an element identifier that is unique at least within the page that the element has been added to.

A given element has associated element attributes. The particular element attributes that are or can be associated with a given element may depend on the type of element in question. By way of example, however, element attributes may include one or more of those shown in the table below:

| Element attribute | Description |
| --- | --- |
| Identifier | Identifier for the element (unique at least within the page the element has been added to). Alternatively, the position (index) of the element within an element list may be used to identify an element. |
| Type | Identifier of a type of the element. For example, a text element, a vector graphic element, a raster graphic element, a video element, an element group, an alternative type of element. |
| Top | The y coordinate of the element's origin (e.g. y coordinate of the top left corner). |

| Element attribute | Description |
| --- | --- |
| Left | The x coordinate of the element's origin (e.g. x coordinate of the top left corner). |
| Width | A value defining the width of the element. |
| Height | A value defining the height of the element. |
| Rotation | A value defining a degree of rotation of the element, e.g. a value x such that −180 degrees <= x <= +180 degrees. |
| Data | Data defining any content of the element - for example the text of a text element, an image source (or image data) for an image element, etc.<br>For text the data field may include both character data (e.g. an array/list or other set of actual characters - e.g. Unicode values) and character attribute data (e.g. an array/list or other set of character attributes that apply to the characters). |

Additional (and/or alternative) element attributes are possible.

Element attributes for a given element may be stored in an element descriptor (which is included in the page's element list). For example:

```
{
    "design": {
        ...
    },
    "elements": [
        {
            "type": "TEXT",
            "top": 100,
            "left": 100,
            "width": 500,
            "height": 400,
            "rotation": 0,
            "Data": {{character data},{character attribute data}}
        }
    ],
}
```

Figure 2:
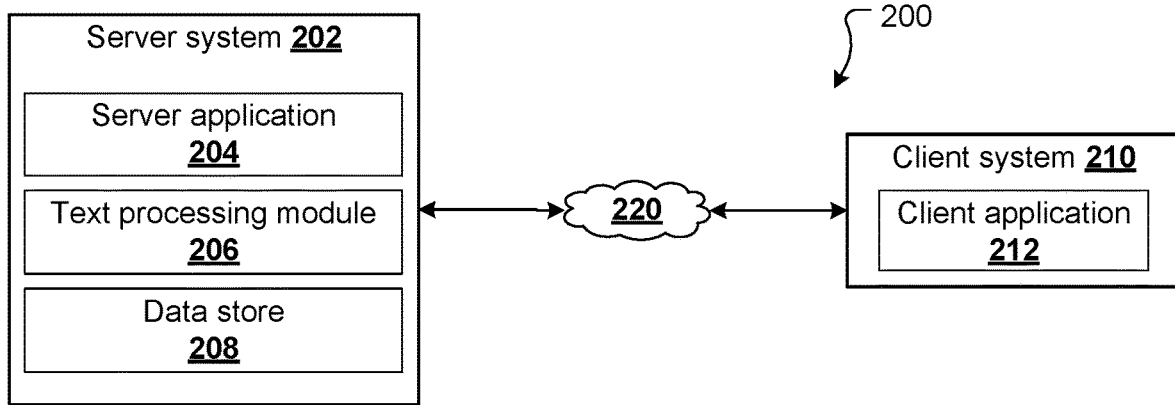
FIG. 2 is a block diagram illustrating an example environment in which features of the present disclosure can be implemented.

FIG. 2 depicts one example of a networked environment 200 in which the various operations and techniques described herein can be performed.

Networked environment 200 includes a server system 202 and a client system 210 that are interconnected via one or more communications networks 220 (e.g. the Internet). While a single client system 210 is illustrated and described, server system 202 will typically serve multiple client systems 210.

The server system 202 includes various functional components which operate together to provide server side functionality.

One component of server system 202 is a front-end server application 204. The server application 204 is executed by a computer processing system to configure the server system 202 to provide server-side functionality to one or more corresponding client applications (e.g. client application 212 described below). The server-side functionality includes operations such as user account management (where required), login (where required), and receiving responding to client requests (e.g. API requests, remote procedure calls, etc.). In the present example the server system 202 provides services/functions related to editable documents (e.g. designs) and as such will typically provide (alone or in conjunction with client application 212) functions such as document creation, document editing, document saving, document sharing/publication, and/or other relevant functions.

To provide the server-side functionality, the server application 204 comprises one or more application programs, libraries, APIs or other software elements. For example, where the client application 212 is a web browser, the server application 204 will be a web server such as Apache, IIS, nginx, GWS, or an alternative web server. Where the client application 212 is a native application, the server application 204 may be an application server configured specifically to interact with that client application 212. Server system 202 may be provided with both web server and application server.

In the present example, server system 202 also includes a text processing module 206 which is described further below. Throughout this disclosure the text processing module 206 will be referred to as the TPM 206.

Server system 202 also includes a data store 208 which is used to store various data required by the server system 202 in the course of its operations. Such data may include, for example, user account data, document template data, data in respect of documents that have been created by users, and/or other data. While one data store 206 is depicted server system 202 may include/make use of multiple separate data stores—e.g. a user data store (storing user account details), one or more element library data stores (storing elements that users can add to documents being created); a template data store (storing templates that users can use to create documents); a documents data store (storing data in respect of documents that have been created); and/or other data stores.

In order to provide server side functionality to clients, server system 202 will typically include additional functional components to those illustrated and described. As one example, server system 202 will typically include one or more firewalls (and/or other network security components) and load balancers (for managing access to the server application 204).

The server system 202 components have been described as functional components, and may be implemented by hardware, software (data and computer readable instructions which are stored in memory and executed by one or more computer processing systems), and/or a combination of hardware and software.

The precise hardware architecture of server system 202 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, a single server application 204 may run on a single, dedicated server computer and data store 206 may run on a separate server computer (with access to appropriate data storage resources). As an alternative example, server system 202 may be configured to provide multiple server applications 204 which are executed on appropriate hardware resources and commissioned/decommissioned based on user demand 204. In this case there may be multiple server computers (nodes) running multiple server applications 204 which service clients via a load balancer.

Client system 210 hosts a client application 212 which, when executed by the client system 210, configures the client system 210 to provide client-side functionality for server application 204 of the server system 202. Via the client application 212, a user can interact with the server application 204 in order to perform various operations such as creating, editing, saving, retrieving/accessing, publishing, and sharing documents.

Client application 212 may be a web browser application (such as Chrome, Safari, Internet Explorer, Opera, or an alternative web browser application) which accesses the server application 204 via an appropriate uniform resource locator (URL) and communicates with server application 204 via general world-wide-web protocols (e.g. http, https, ftp). Alternatively, the client application 212 may be a native application programmed to communicate with server application 204 using defined application programming interface (API) calls.

Client system 210 may be any computer processing system which is configured (or configurable) by hardware and/or software to offer client-side functionality. By way of example, client system 210 may be a desktop computer, a laptop computer, a netbook computer, a tablet computing device, a mobile/smart phone device, a personal digital assistant, or an alternative computer processing system.

Although not illustrated in FIG. 2, client system 210 will typically have additional applications installed thereon, for example, at least an operating system application such as a Microsoft Windows operating system, an Apple macOS operating system, an Apple iOS operating system, an Android operating system, a Unix or Linux operating system, or an alternative operating system.

In example environment 200 server system 202 includes a text processing module (TPM) 206. The TPM 206 is a software module that includes instructions and data for performing various text processing operations described herein.

While the TPM 206 has been depicted and described as distinct to the server application 204, the functionality provided by the TPM 206 could be natively provided by the server application 204 (i.e. by sever application 204 itself including relevant instructions and data to perform the processing that is described as being performed by the TPM 206).

In alternative implementations, the TPM 206 could be provided at the client system 210—e.g. as a stand-alone application in communication with the client application 212, a plug-in/add-on/extension to client application 212, or an integral part of client application 212.

In further implementations, the functions provided by the TPM 206 could be provided as an entirely separate service—e.g. running on a separate server system to server system 202 and communicating with client application 212 (and/or server system 202) as required to perform various processing described herein.

In still further implementations, the functionality described as being performed by the TPM 206 could be distributed between multiple systems (e.g. client system 210 and server system 202).

The features and techniques described herein are implemented using one or more computer processing systems.

For example, in networked environment 200 described above, client system 210 is a computer processing system (for example a personal computer, tablet/phone device, or other computer processing system). Similarly, the various functional components of server system 202 are implemented using one or more computer processing systems (e.g. server computers or other computer processing systems).

Figure 3:
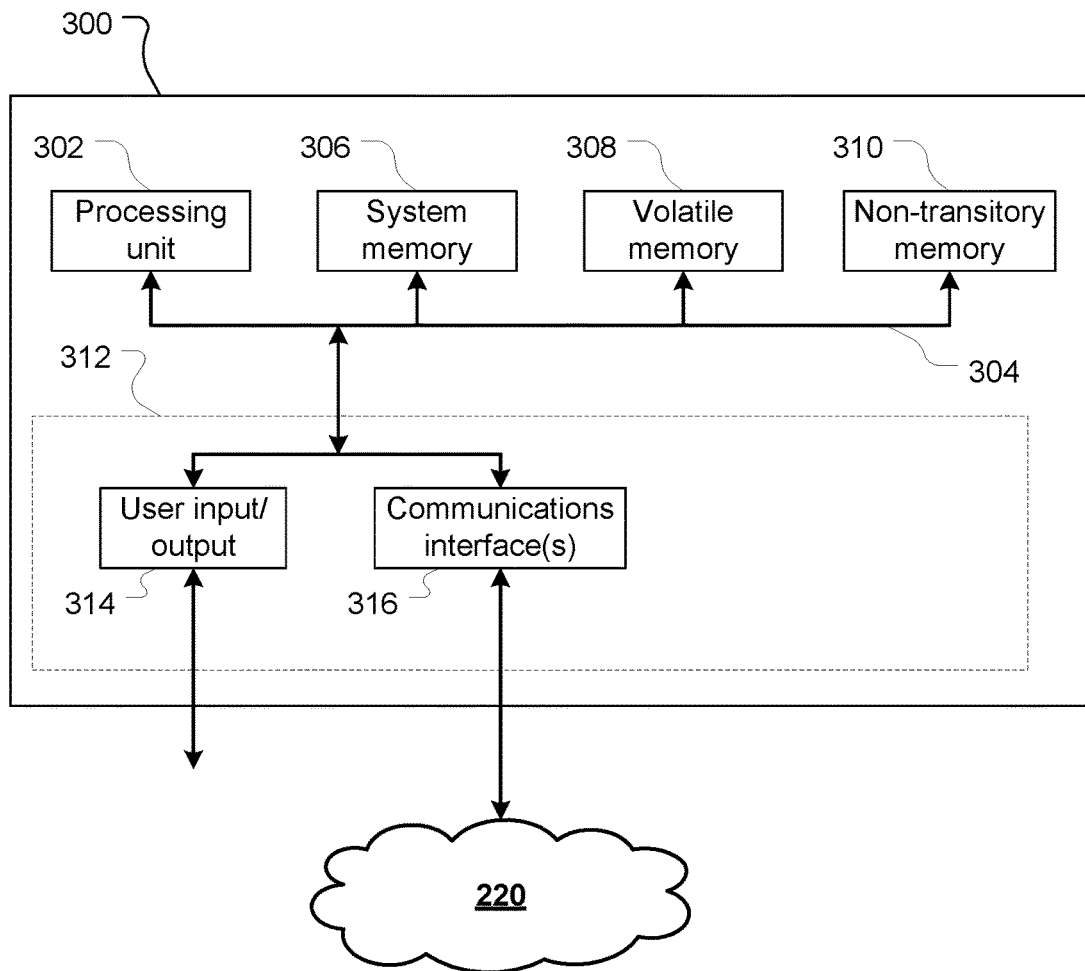
FIG. 3 is an example computer processing system configurable to perform various features described herein.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function, all processing required to perform that operation or function will be performed by processing unit 302. In other instances, processing required to perform that operation or function may also be performed by remote processing devices accessible to and useable by (either in a shared or dedicated manner) system 300.

Through a communications bus 304, the processing unit 302 is in data communication with a one or more machine readable storage (memory) devices which store instructions and/or data for controlling operation of the processing system 300. In this example, system 300 includes a system memory 306 (e.g. a BIOS), volatile memory 308 (e.g. random access memory such as one or more DRAM modules), and non-volatile memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices and the like. System 300 may also include or connect to one or more output devices controlled by system 300 to output information. Such output devices may include devices such as display devices, speakers, vibration modules, LEDs/other lights, and such like. System 300 may also include or connect to devices which may act as both input and output devices, for example memory devices (hard drives, solid state drives, disk drives, compact flash cards, SD cards and the like) which system 300 can read data from and/or write data to, and touch screen displays which can both display (output) data and receive touch signals (input).

System 300 also includes one or more communications interfaces 316 for communication with a network, such as network 220 of environment 200 (and/or a local network within the server system 202 or OS). Via the communications interface(s) 316, system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (or software of modules)—i.e. computer readable instructions and data which, when executed by the processing unit 302, configure system 300 to receive, process, and output data. Instructions and data can be stored on non-transitory machine readable medium accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application. System 300 also stores or has access to applications which, when executed by the processing unit 302, configure system 300 to perform various computer-implemented processing operations described herein. For example, and referring to the networked environment of FIG. 2 above: client system 210 includes a client application 212 which configures the client system 210 to perform the operations described herein.

In some cases, part or all of a given computer-implemented method will be performed by system 300 itself, while in other cases processing may be performed by other devices in data communication with system 300.

Figure 4:
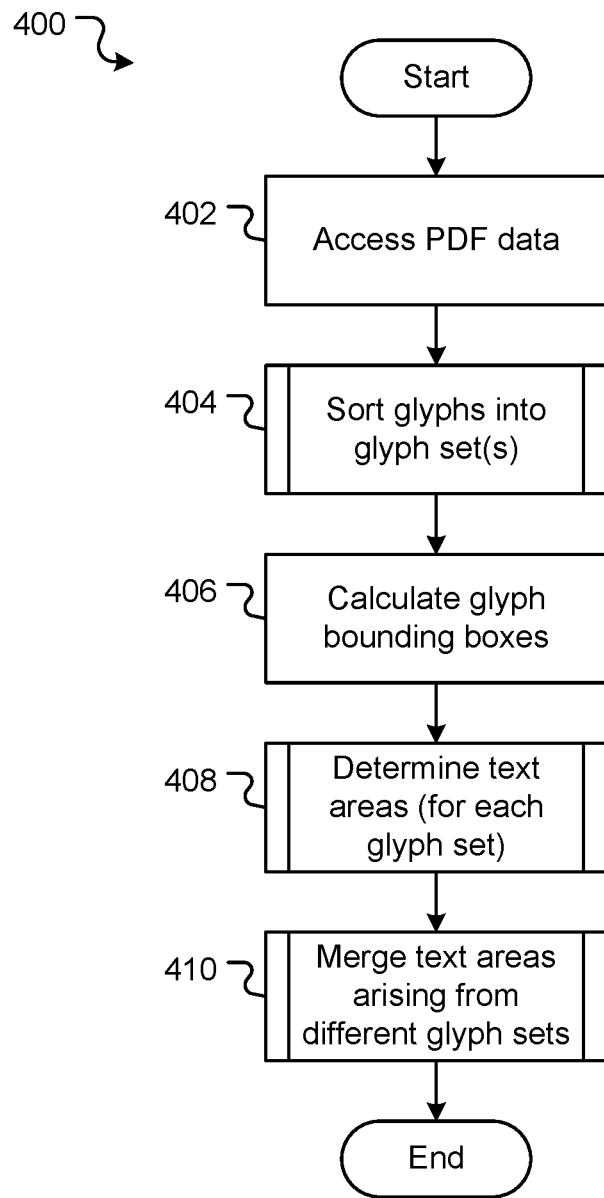
FIG. 4 is a flowchart depicting operations involved in processing PDF text data to determine text areas.

Turning to FIG. 4, a text area determination process 400 will be described.

Processing is described as being performed by the text processing module (TPM) 206, however processing could be performed by an alternative module, application, or group of modules/applications.

Operations of the text area determination process 400 are described in the context of PDF text data for horizontal text. The operations can, however, be adapted to apply to vertical text. Horizontal and vertical in this context refer to the direction of the text (i.e. Top to bottom) rather than rotation (i.e. horizontal text rotated 90 degrees is still horizontal text).

Over the course of the processing described below the TPM 206 generates various data. In order to illustrate this data tables are used. It will be appreciated, however, that TPM 206 may be configured to generate and store the data in any appropriate format—e.g. using one or more arrays, lists, objects/dictionaries, and/or other data types.

At 402, the TPM 206 accesses PDF text data. This may, for example, be in response to a user of client application 212 importing or otherwise selecting (e.g. by copying and pasting) PDF text data into an editable document being worked on.

The PDF text data may be included in an entire PDF document (in which case each page of the PDF document is processed separately) or a selected page of a PDF document. Alternatively, a selection of PDF text data from a PDF document or page may be received/accessed (for example, as the result of a selection/cut and paste operation). For present purposes, any non-text pdf data that is in the received/accessed PDF data is ignored.

Generally speaking, the PDF text data will describe a plurality of glyphs. For each glyph that is to be rendered various attributes will be defined (as set out in the PDF standard, ISO 32000). For present purposes, however, some of the relevant glyph data includes: position data (i.e. data defining a position of the glyph in glyph space); size data (i.e. data defining a size of the glyph, e.g. a font size, fontBBox, ascent, Descent, CapHeight); font type (i.e. data defining the font type of the glyph, for example by the font, subtype, BaseName attributes); transformation data (e.g. an Affine transform describing transformations such as none/identity, rotation, shear, or other transformations).

For the purposes of the area detection process 400 each glyph of the PDF data is described as having a unique (or, at least, unique for a given page) glyph identifier. The glyph identifier may be explicitly created and stored. Glyphs may, however, be identified/tracked by other means (for example a glyph's position/index in a data structure).

Figure 5:
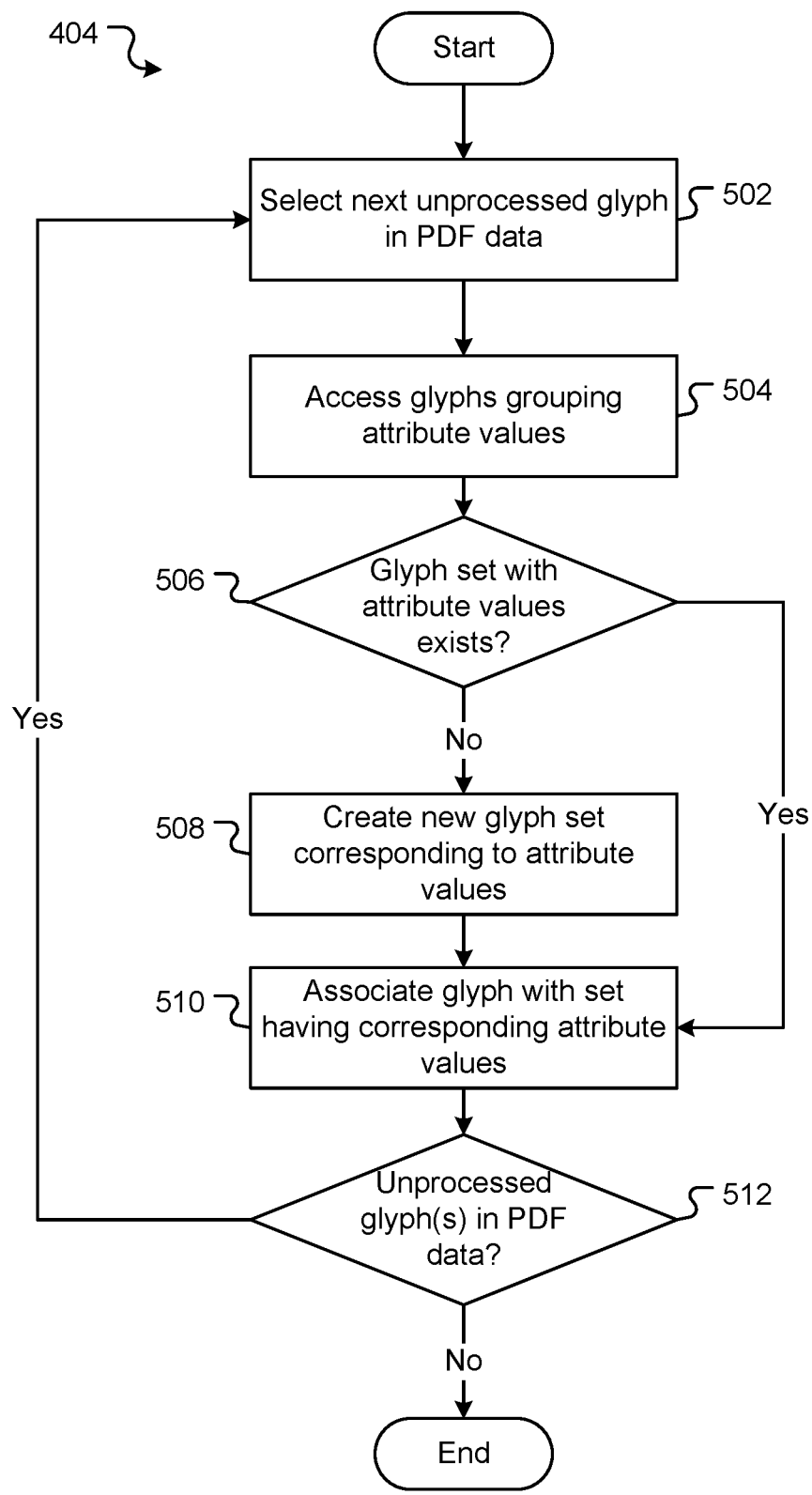
FIG. 5 is a flowchart depicting operations involved in assigning glyphs to glyph sets.

At 404, the TPM 206 sorts the glyphs defined by the PDF data into one or more glyph sets. This processing is described below with reference to FIG. 5, and results in one or more glyph sets, each glyph set being associated with all glyphs from the PDF data that share the same values for defined grouping attributes.

In the present embodiments the defined grouping attributes are font family, font size, and rotation. Rotation is determined from (or calculated based on) a glyph's transformation data. With respect to rotation, some tolerance may be provided (for example so that if the rotation of two glyphs is calculated to be within x degrees the glyphs will be considered to have the same rotation. If used, the rotation threshold would typically be set a low value (for example in tenths or hundredths of a degree).

A depiction of a dataset generated at 404 and in which glyphs are associated with glyph sets is as follows:

| Set ID | Set attribute values | Glyphs |
|---|---|---|
| 0001 | {Family: "Times", Size: 12, rotation: 0} | [0001, 0002, . . . , . . .] |
| 0002 | {Family: "Times", Size: 12, rotation: 30} | [0138, 160, . . . , . . .] |
| . . . | . . . | . . . |

In this example, therefore, all glyphs that are in the "Times" font family, have font size 12, and 0 degrees rotation are associated with the glyph set having set ID 0001 (and set attributes of Times, 12, 0).

At 406, the TPM 206 calculates glyph bounding boxes for all glyphs. In the present example this is done on a glyph set by glyph set basis.

A glyph bounding box defines (or includes data that can be used to calculate) a set of four coordinates: (min x, max x, min y, max y). The coordinates are in the coordinate system of a page that the glyphs are ultimately to be rendered on. A glyph bounding box may explicitly define the four coordinates. Alternatively, the bounding box may define data allowing the four coordinates to be calculated. As one example, a bounding box may define a min x coordinate, a width, a min y coordinate, and a height. In this case the max x coordinate is calculated by adding the width to the min x coordinate and the max y coordinate is calculated by adding the height to the min y coordinate. Alternatives are possible.

In order to calculate the bounding box for a given glyph, the TPM 206 first processes the glyph's transformation data to make a determination as to whether glyph is rotated. This can, for example, be done via polar decomposition (though other mechanisms can be used). If so, the glyph's rotation is reset to a common rotation (conveniently zero) for the purposes of the bounding box calculation and subsequent processing (i.e. so the glyph's bounding box is calculated as if the glyph were horizontally oriented). This rotation operation is performed to improve the efficiency of the downstream calculations (which, with a rotation of zero, need only deal with vertical and horizontal lines rather than arbitrarily angled lines).

Following this, the glyph's bounding box coordinates are calculated.

In this respect, it is noted that the PDF specification provides for a font descriptor to be provided for a font that is embedded in a PDF document. Where provided, the font descriptor provides various metadata in respect of a font such as: FontBBox ("should be the smallest rectangle enclosing the shape that would result if all of the glyphs of the font were placed with their origins coincident and then filled"); Ascent ("the maximum height above the baseline reached by glyphs"); Descent ("the maximum depth below the baseline reached by glyphs in this font. The value shall be a negative number"); and CapHeight ("the vertical coordinate of the top of flat capital letters, measured from the baseline").

Font descriptors are not, however, required. Even where they are provided, certain values may not be included (for example the above attributes are not required for Type 3 fonts) or may not accurately reflect the "physical" representation of the font or the glyph.

In the present embodiments the TPM 206 calculates glyph bounding boxes as follows. Bounding boxes can, however, be calculated in alternative ways (including by relying on the FontBBox metadata if this is defined in a font descriptor).

Initially, the TPM 206 determines the following values: glyph height, glyph Y, glyph width, and glyph X.

If CapHeight metadata exists, and the defined CapHeight is >0, the TPM 206 uses the CapHeight as the glyph height. Otherwise, the TPM 206 calculates the glyph height as FontBBox.Height−Math.abs(Descent).

The TPM 206 calculates the glyph Y coordinate as FontBBox.lowerY+Math.abs(Descent).

The TPM 206 determines the width to be the width of the individual glyph in question, as defined by the Font itself.

The TPM 206 determines the glyph X to be 0.

As can be seen, even though the PDF data may directly define a bounding box for the glyph (FontBBox data), if other metadata is available (e.g. CapHeight, width, Descent) this is used to calculate an alternative glyph bounding box to that defined by the PDF data. This is done in order to provide a more useful (at least for the purpose of the present disclosure) bounding box. If parameters required to perform the calculations above are not available to the TPM 206 (e.g. because they are not defined in a Font descriptor), the TPM 206 falls back to using glyph bounding box coordinates as defined by the PDF data itself.

PDF Fonts define glyphs & boundaries in their own coordinate system, and define how many units per EM are used (common values are 1000, or 2048). This is relevant when font dimensions are transformed into document dimensions to render a font in a particular size.

The glyph height, glyph Y, glyph width, and glyph X values, therefore, define a bounding box (rectangle) in glyph space. Following determination of these values the TPM 206 transforms the glyph space bounding box into a document space bounding box: i.e. a rectangle in the coordinate system of the document the PDF data is being imported into.

When transforming to document space, the glyph (and glyph bounding box rectangle) is not only scaled, but is also vertically and horizontally adjusted in order to be at the correct position in the document (which is why reference X can be hard-coded to 0 in the calculation above). Various known transformation calculations can be implemented to perform this transformation.

In the present embodiment, once a glyph's document space bounding box has been calculated (by transforming the glyph's glyph space bounding box to the document space) the TPM 206 calculates an expanded bounding box (the expanded bounding box also being in document space).

In this embodiment, the TPM 206 calculates a glyph's expanded bounding box by applying a horizontal expansion factor and a vertical expansion factor to the glyph's document space bounding box. The inventors have identified that a horizontal expansion factor of 1.6 and a vertical expansion factor of 3.3 provide good results. (If vertical text was being processed these expansion values would need to be swapped.) Alternative horizontal and/or vertical expansion factors can, however, be used. In calculating a glyph's expanded bounding box TPM 206 expands the originally calculated bounding box evenly on all sides so the original bounding box is centered in the expanded bounding box.

In alternative embodiments, the expansion factor(s) may be applied to the glyph space bounding box, in which case transforming the expanded glyph space bounding box generates a corresponding expanded document space bounding box.

Accordingly, following 406 an expanded bounding box (with coordinates in document space) has been created for each glyph. A depiction of a dataset generated at 406 and in which glyphs are associated with bounding box data is as follows:

| Glyph ID | Expanded bounding box |
|---|---|
| 0001 | Data defining (or allowing calculation of) (min x, max x, min y, max y) |
| 0002 | Data defining (or allowing calculation of) (min x, max x, min y, max y) |
| ... | ... |

In this example the originally calculated glyph space bounding box and originally calculated document space bounding box (i.e. before expansion) coordinates have not been stored. These values could, however, also be stored for future reference.

Following calculation of the At 408, the TPM 206 processes each glyph set (as determined at 406) to determine one or more text areas. The glyph sets can be processed according to 408 sequentially (in any order) or in parallel.

Figure 6:
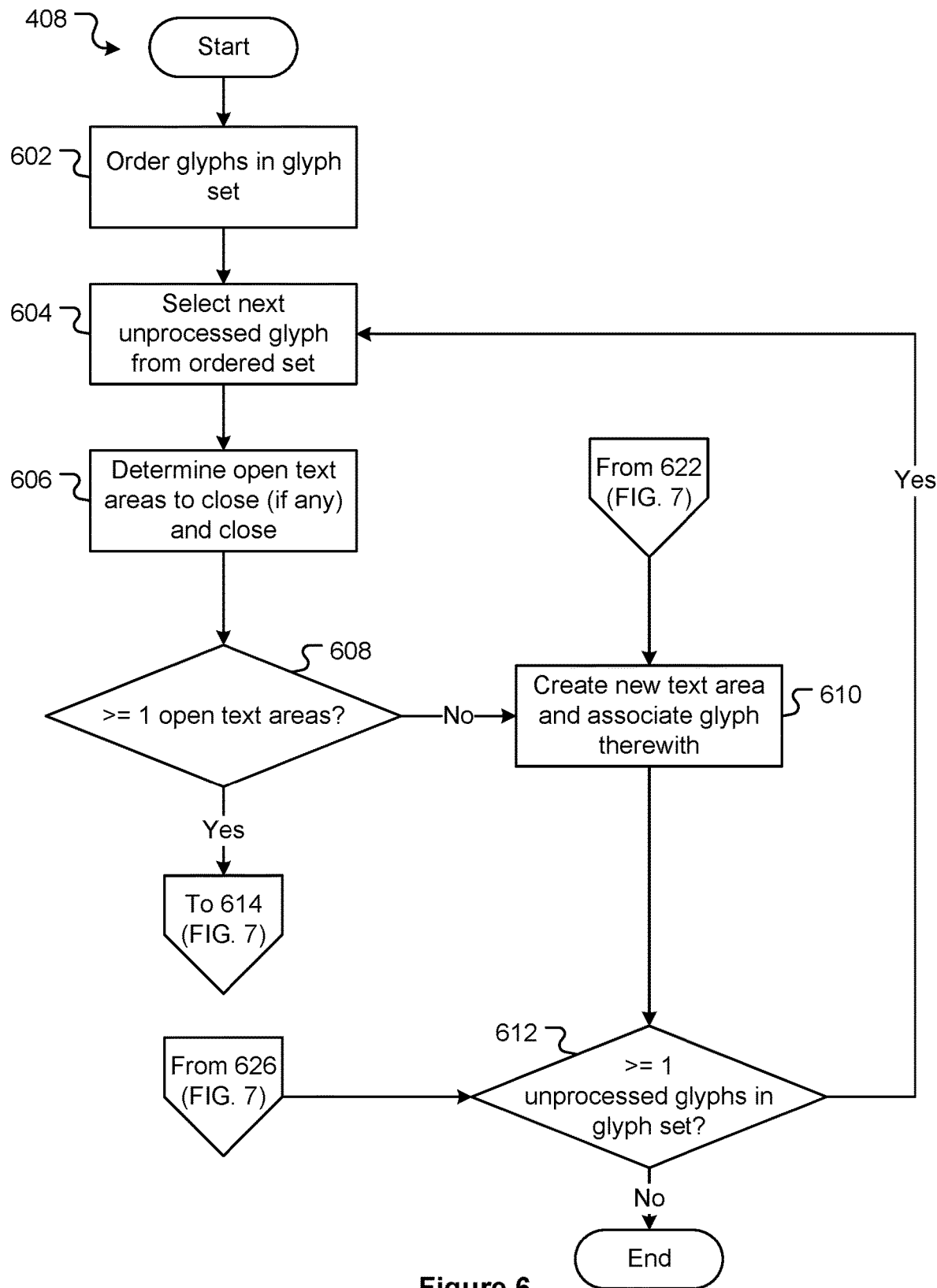
FIGS. 6 and 7 provide a flowchart depicting operations involved in processing glyph sets to determine text areas.

Determining text areas at 408 is described below with reference to FIGS. 6 and 7. For each glyph set, this results in data defining one or more text areas. In the present embodiments, each text area is identified by a text area identifier which is associated with glyph identifiers of all glyphs that have been assigned to that text area. Each text area identifier is also associated a text area bounding box—e.g. data defining (or allowing calculation of) a (min x, max x, min y, max y) coordinate set. In the present embodiments the text area bounding box is stored, however it can be calculated based on the text area's member glyphs.

Furthermore, as each text area is generated from processing a particular glyph set, a given text area can also be associated with the attribute values of that glyph set (e.g. the glyph set's font type, font size, and rotation). Accordingly, following 408 a dataset of text areas has been (or can be) generated, each text area defined by (for example) the following fields:

| Field | Value |
|---|---|
| Text area identifier | The identifier of the text area. |
| Text area attributes | The grouping attribute values of the glyphs of the text area (e.g. font type, font size, rotation). Additionally, or alternatively, this field may reference the glyph set ID of the glyph set the text area relates to. In this case the grouping attribute values can be retrieved from the glyph set data described above. |
| Text area members | An array/other list of identifiers of the glyphs which have been assigned to the text area. |
| Text area bounding box | Data defining (or allowing calculation of) (min x, max x, min y, max y) coordinates of the currently selected glyph's expanded bounding box. |

Figure 8:
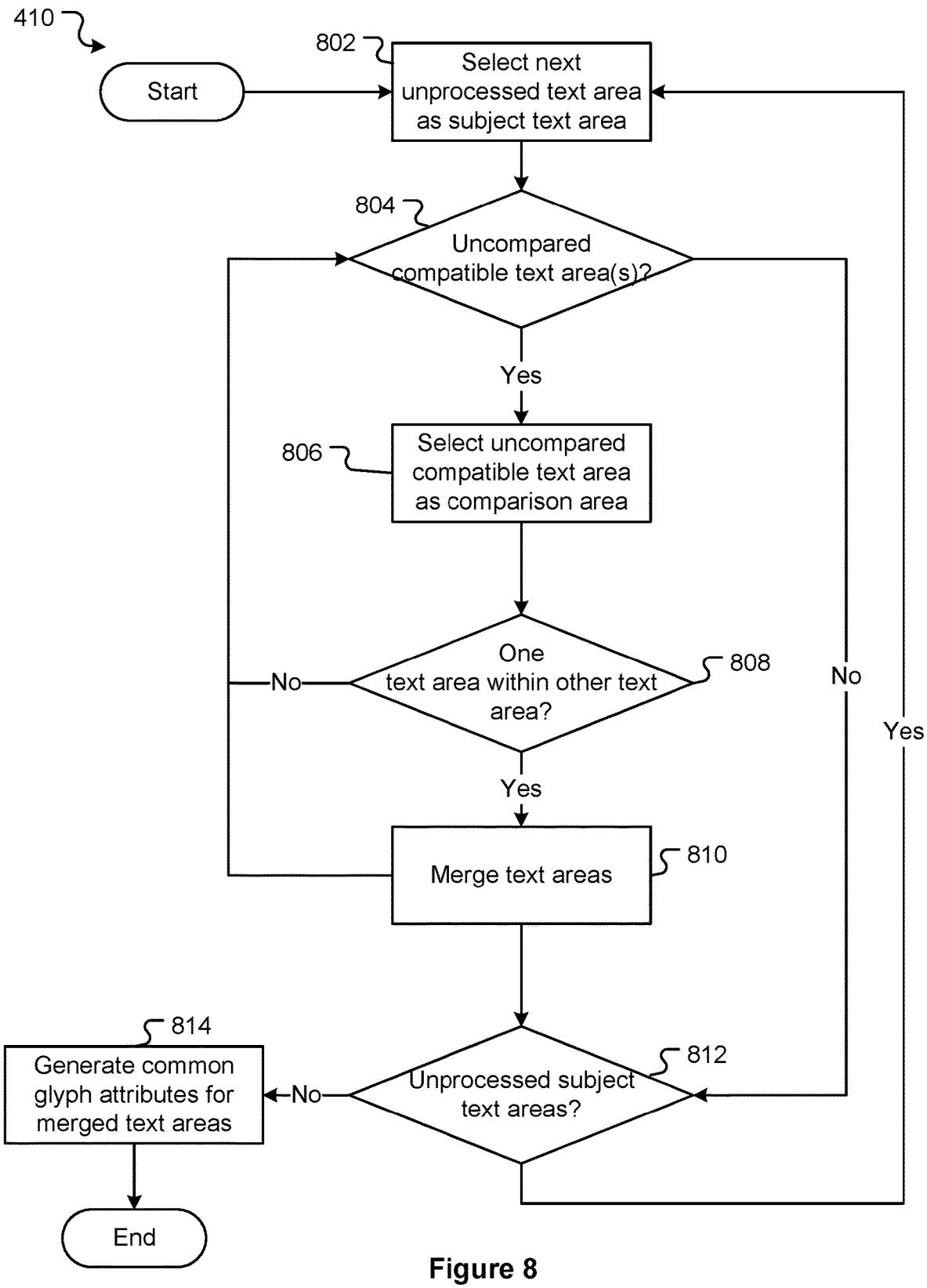
FIG. 8 is a flowchart depicting operations involved in merging text areas.

At 410, the TPM 206 determines whether any of the text areas determined at 408 should be merged and, if so, merges those text areas. This process is described with reference to FIG. 8 below, however generally involves determining whether any text area that was generated from processing a first glyph set encompasses a compatible text area that was generated from processing a second (different) and, if so, merging those two text areas into a single text area.

In some implementations the TPM 206 does not attempt to merge text areas generated from different glyph sets and the processing at 410 is not performed.

Following 410 (or 408 where 410 is not performed), the TPM 206 has generated a set of text areas. This set of text areas can be used in various ways. For example, each text area can be rendered in an editing interface as a single text element based on the text area's bounding box (rotated, if required, back to the original rotation of the text area's member glyphs) and individual glyph positions (again, rotated back to original rotation if required).

Figure 9:
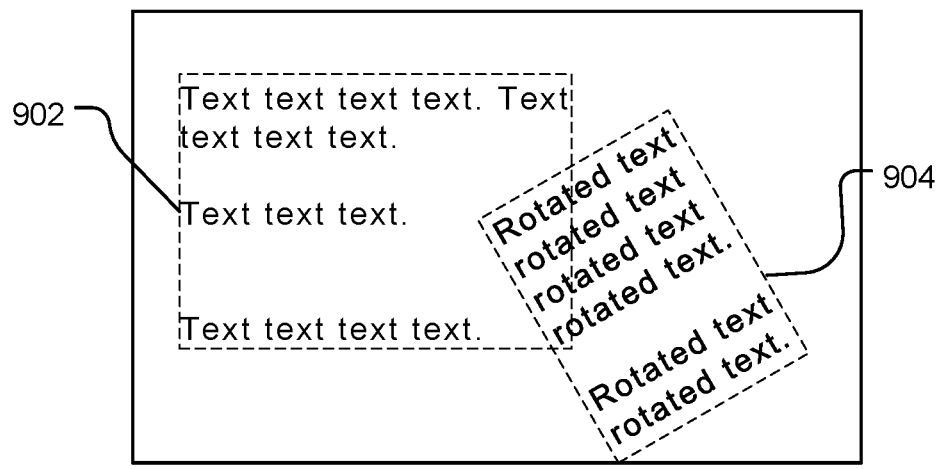
FIG. 9 depicts an editable document page.

Generating text elements in this way is advantageous, particularly when compared with a process that does not determine when glyphs are part of a single text area and renders them as separate text elements (e.g. as depicted in pages 110 and 120 of FIG. 1). To illustrate this, FIG. 9 provides a depiction of text elements generated by processing page 100 of FIG. 1. As can be seen, the text area detection process 400 has generated two separate text areas. Each text area has then been converted into a single text element: text element 902 (corresponding to the horizontal text 102 of page 100) and text element 904 (corresponding to the rotated text 104 of page 100).

In the illustrated example, generating two text elements (as opposed to generating one text element per character or one text element per line) provides a far better user experience for an user that wishes to edit (or move, resize, otherwise manipulate) the text. For example, in order to edit any of the characters in text element 902 a user can simply select the element and edit as one would a normal paragraph in a text editor. For example, if characters are added/removed the text can flow within the singular element. Similarly, if the text element is resized (e.g. made wider, narrower, taller, shorter) the flow of the text from all three lines can be adjusted to accommodate this.

Furthermore, generating two text elements can provide (if the editable document is saved in a new format) for a smaller document size and efficient document processing. In this particular example, rather than having to store data in respect of a large number text elements (e.g. per pages 110 or 120 of FIG. 1) (and then process that data to render the document), data in respect of only two text elements needs to be stored and processed. While the same number of characters needs to be stored in both cases, the data overhead incurred for each additional text element is reduced in the latter case.

At 404 of text element determination process 400 the TPM 206 sorts the glyphs defined by the PDF data into one or more glyph sets. This involves associating each glyph with one (and only one) glyph set. An example process 500 for doing so will now be described with reference to FIG. 5.

At 502, the TPM 206 selects the next unprocessed glyph in the PDF data. Glyphs may be selected for processing in any order (e.g. the order in which they appear in the PDF data) so long as all glyphs in the PDF data are processed. If there are no glyphs in the PDF data process 500—and the overall text area detection process—ends. In this case an error may be generated/output, for example an error indicating that there is no recognisable text in the PDF data.

At 504, the TPM 206 accesses or calculates grouping attribute values for the glyph. In the present embodiments, the defined grouping attributes are font type, font size, and rotation. Font type and font size can be accessed from the PDF data, and rotation can be calculated based on transformation data as described above). In alternative embodiments additional, fewer, and/or alternative grouping attributes may be used.

At 506, the TPM 206 determines whether a glyph set having set values that correspond to the glyph's attribute values (determined at 504) exists. Where a grouping attribute's value is continuous the TPM 206 may employ threshold so that values are determined to match/correspond even if they are not identical. As described above, rotation may be one example of such a continuous attribute for which a rotation threshold may be employed (so that a glyph's rotation value that is within the threshold of the glyph set's rotation value will be determined to match even if not identical).

If, at 506, no corresponding glyph set exists, processing proceeds to 508. At 508, the TPM 206 creates a glyph set corresponding to the glyph attribute values. This may be done, for example, by the TPM 206 generating a unique glyph set identifier and associating it with the attribute values in question (which become the set's attribute values). Processing then proceeds to 510.

If, at 506, a corresponding glyph set does exist, processing proceeds directly to 510.

At 510, the TPM 206 associates the glyph being processed with the glyph set having corresponding attributes. This may be done, for example, by associating an identifier of the glyph being processed with the set (e.g. by appending the glyph identifier to an array or other set of glyph identifiers that is associated with the glyph set).

Glyph sets may be defined, and glyphs associated with glyph sets, in various ways. As one example, however, process 500 may generate a data set in which each record defines: a glyph set identifier (i.e. a unique identifier of the glyph set); the set's grouping attribute values (i.e. The unique combination of grouping attribute values that all glyphs associated with the set have); and an array (or list or other grouping) of glyph identifiers that have the relevant grouping attribute values.

At 512, the TPM 206 determines if there are any unprocessed glyphs in the PDF data. If so processing returns to 502 to select (and then process) the next glyph. If all glyphs have been processed the association of the glyphs with glyph sets is complete.

At 408 of the text element determination process 400 described above, the TPM 206 processes each glyph set to determine one or more text areas. The processing of a given glyph set to determine its one or more text areas will be described with reference to FIGS. 6 and 7.

Over the course of the text area determination process the TPM 206 generates and updates text area data. In the present example, the text area data includes a text area record for each text area that is generated. The data for each text area record includes a text area identifier, a text area state, text area members, and text area bounding box.

The text area identifier is used to identify the text area. Text area identifiers are unique across glyph sets so that (for example) the text area identifiers generated in processing one glyph set (as determined at 404) are different to the text area identifiers generated when processing another glyph set. Any appropriate identifier can be used—for example: integers that increment for each text area that is created (e.g. 001, 002, 003, . . . ), a compound identifier that includes a glyph set identifier and text area identifier, for example in the format <glyph set id>.<text area id> (e.g. 001.001, 001.002, . . . 005.001, . . . ), or any other format.

The text area state is a flag/variable that indicates a state of the text area, in this case whether the text area is open or closed.

The text area members field is a record of glyphs that have been assigned to the text area. This may, for example, be an array (or list or other data type) of glyph identifiers.

The text area bounding box is a set of coordinates that define the bounding box of the text area—e.g. (min x, max x, min y, max y). A text area's bounding box is calculated based on the bounding boxes of the glyphs that have been assigned to the text area. In alternative embodiments, rather than saving the text area bounding box it can be recalculated as and when it is needed based on the subset's elements.

Area determination process 408 is described with reference to a processing direction which impacts various operations performed over the course of the process. Generally speaking, the processing direction for horizontal text will be a horizontal direction (either left to right or right to left—or, more properly, and depending on the coordinate system, min x to max x or max x to min x) while the processing direction for vertical text will be a vertical direction (top to bottom or bottom to top—or, more properly, and depending on the coordinate system, min y to max y or max y to min y). In the main example described the processing direction is left to right. The process can be adapted, however, for other area processing directions (e.g. right to left, top to bottom, bottom to top).

Generally speaking, area detection process 408 operates to associate each glyph in the glyph set being processed to a text area. To do this TPM 206 determines groups of collectively overlapping glyphs. The glyphs in a given group of collectively overlapping glyphs are then associated with a text area. Collectively overlapping glyphs are glyphs that, as a group, have overlapping expanded bounding boxes. For example, if a first glyph overlaps a second glyph and the second glyph overlaps a third glyph, then the first second and third glyphs are collectively overlapping (even if the first glyph does not itself overlap the third glyph) and therefore will be associated with a particular text area. A fourth glyph that does not overlap any of the first, second, or third glyphs (or any other glyphs that overlap the first second or third glyphs) will be part of separate group (and ultimately be associated with a separate text area).

At 602, the TPM 206 orders the glyphs in the glyph set being processed in the processing direction. In the present example glyphs are ordered based on their expanded bounding box coordinates (as calculated at 406). Glyphs could, however, be ordered based on their glyph space bounding boxes or unexpanded document space bounding boxes.

Where the processing direction is left to right, TPM 206 orders glyphs based on expanded bounding box min x coordinates (lowest min x to highest min x). If two or more glyphs have expanded bounding boxes with the same min x coordinate those glyphs can be further ordered in any manner (for example by then considering min y coordinates).

At 604, the TPM 206 selects the next unprocessed glyph from the ordered glyph set for processing. Where the processing direction is left to right (e.g. min x to max x), the TPM 206 will initially select the leftmost (or equal leftmost) glyph from the glyph set. In subsequent iterations the TPM 206 works through the glyphs from left to right by selecting the next leftmost (or equal leftmost) glyph for processing at each iteration.

At 606, the TPM 206 determines if any open text areas should be closed.

Where the processing direction is left to right TPM 206 compares the min x coordinate of the selected glyph's expanded bounding box to the max x coordinate of each open text area's bounding box. If the glyph's expanded bounding box min x is greater than an open text area's bounding box max x, TPM 206 determines that the open text area should be closed. TPM 206 then closes the text area, for example, by setting the state variable for the text area to "closed".

At 608, the TPM 206 determines if there are any open text areas—i.e. any text areas with a state value indicating the text area is open. At least in the first iteration of 408 there will be no open text areas. If there are no open text areas, processing proceeds to 610.

At 610, the TPM 206 has either determined that there are no open text areas (at 608) or that the glyph does not overlap with any open text areas (and, therefore, the merge list is empty 622). At 610, the TPM 206 creates a new open text area and associates the glyph with that new text area. In the present example this involves the TPM 206 generating a new text area record such as:

| Field | Value |
|---|---|
| Text area identifier | New identifier created by the TPM 206. |
| Text area state | Initialized to open (e.g. "open") |
| Text area members | An array/other list to which the glyph identifier of the currently selected glyph is added. |
| Text area bounding box | Data defining (or allowing calculation of)(min x, max x, min y, max y) coordinates of the currently selected glyph's expanded bounding box. |

Following creation of the new text area at 610, processing proceeds to 612. At 612, the TPM 206 determines if there are any unprocessed glyphs in the glyph set currently being processed. If so, processing returns to 604 to select the next glyph for processing.

If, at 612, all glyphs in the glyph set have been processed the text area determination process for that glyph set is complete. At this point every glyph in the glyph set has been assigned to a single text area and the bounding box for each text area has been calculated. The text area dataset for a given glyph set includes, therefore, one or more text area records, each text area record including: a text area identifier; the text area state (though on completion of process 408 this is no longer relevant); a list (or array or other record) of glyphs that are members of the text area; and the text area's bounding box coordinates (though it is again noted that these could be calculated from the constituent members rather than being stored if desired).

Figure 7:
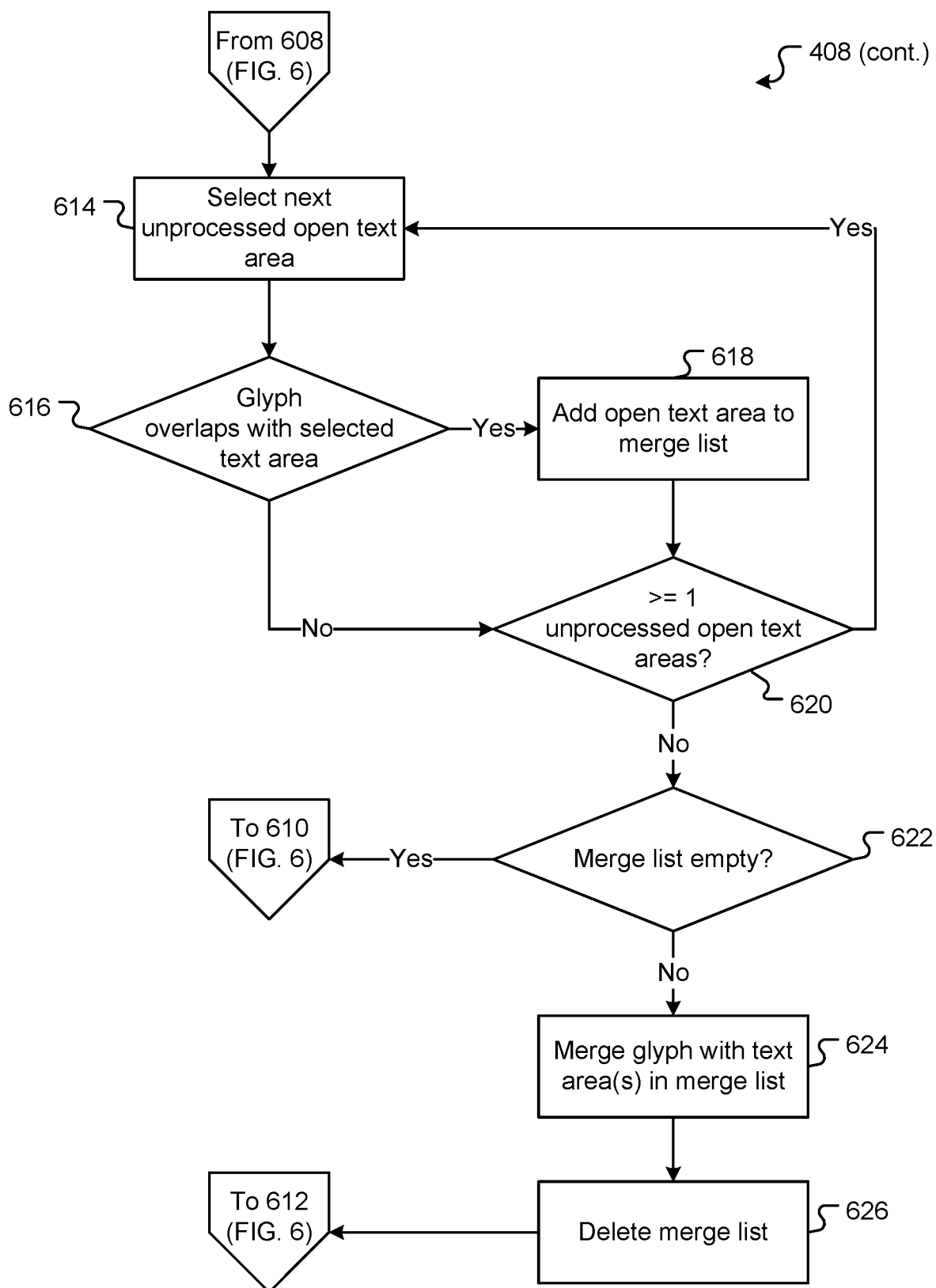

Returning to 608, if the TPM 206 determines if there is at least one open text area processing proceeds to 614 (FIG. 7).

Each time the TPM 206 determines that there is at least one open text area a processing loop (in this case involving operations 614, 616, 618, and 620) is performed. In this loop the TPM 206 compares the currently selected glyph with each unprocessed open text area to determine if they overlap in the processing direction or not.

Accordingly, at 614 the TPM 206 selects the next unprocessed open text area that the current glyph is to be compared to. Open text areas can be processed in any order.

At 616, the TPM 206 determines if the currently selected glyph overlaps the selected open text area. This involves comparing the glyph's expanded bounding box (as calculated 406) to the bounding box of the selected open text area (as retrieved from the text area's record) to determine if they overlap. The TPM 206 can make this determination, for example, by use of a library function that takes two rectangles (or relevant coordinates thereof) and returns a value indicating whether the rectangles overlap or not.

If, at 616, the TPM 206 determines that glyph does not overlap with the currently selected text area, processing proceeds to 620.

If, at 616, the TPM 206 determines that glyph does overlap with the currently selected text area, processing proceeds to 618. At 618, the TPM 206 adds the currently selected open text area to a merge list (creating the merge list if it does not already exist). In the present example, the merge list is a list (or array or other data structure) of text area identifiers. Processing then proceeds to 620.

At 620, the TPM 206 determines whether there are any open text areas that have not been processed for the currently selected glyph. If there are one or more unprocessed open text areas, processing returns to 614 to select the next unprocessed open text area (and process it).

If all open text areas have been processed for the current glyph, processing proceeds to 622. At 622 the TPM 206 determines if the merge list is empty. If the merge list is empty (or no merge list has been created for the current glyph) this means that the current glyph has not overlapped with any open text areas. In this case processing proceeds to 610 (FIG. 6) where a new text area is created for the current glyph (as described above).

If, at 622, the merge list includes one or more text areas, processing proceeds to 624. At 624, the TPM 206 merges the current glyph with the text area(s) defined in the merge list.

Merging the current glyph and text areas can be performed in various ways. In the present embodiment, the TPM 206 performs merging by creating a new text area record as follows:

| Field | Value |
|---|---|
| Text area identifier | New identifier created by the TPM 206. |
| Text area state | Initialized to open (e.g. "open") |
| Text area members | Array/list populated with the glyph identifier of the currently selected glyph along with all glyph identifiers associated with all text areas that are being merged. |
| Text area bounding box | Calculated based on text area members. |

As noted, bounding box for the new text area is calculated based on the expanded bounding boxes of the new text area's member glyphs. For example:

| New text area bounding box coordinate | Calculation |
|---|---|
| Min x | Minimum (or equal minimum) min x of all member glyph expanded bounding boxes |
| Max x | Maximum (or equal maximum) max x of all member glyph expanded bounding boxes |
| Min y | Minimum (or equal minimum) min y of all member glyph expanded bounding boxes |
| Max y | Maximum (or equal maximum) max y of all member glyph expanded bounding boxes |

Where the TPM 206 merges by creating a new text area the TPM 206 also deletes the text areas included in the merge list (given these have now been merged into a new text area).

In alternative embodiments, rather than merging by creating a new text area the TPM 206 may merge by: selecting one of the text areas in the merge list; adding the current glyph (and glyphs of any other text areas in the merge list) to that selected text area; recalculating the bounding box of the selected text area (as described above); deleting all other text areas in the merge list.

After the TPM 206 has merged the glyph with the text area(s) in the merge list processing continues to 626. At 626 the TPM 206 deletes the merge list (or at least deletes the text area(s) added to it). Following deletion of the merge list processing proceeds to 612 (FIG. 6) to determine whether further glyphs in the glyph set require processing.

In process 408 as described above areas that are created (at 610) are associated with an open or closed state. This improves the efficiency of the processing as each glyph need only be compared with open text areas (e.g. in the processing loop commencing at 614). In alternative implementations, however, areas that are created need not be associated with an open/closed state. In this case, though, each glyph needs to be compared with all text areas that have been created which in most cases will increase the processing required.

Glyphs are sorted at 602 so they can be easily processed in order. In alternative implementations sorting operation 602 can be omitted, in which case glyphs (or glyph bounding boxes) are processed at each iteration in order to identify and select (at 604) the next unprocessed glyph in the requisite order.

As noted, if a different processing direction is used certain parts of process 408 are adapted to account for this. By way of example, if the processing direction was right to left: the TPM 206 would sort glyphs at 602 based on their expanded bounding box max x coordinates (highest max x to lowest max x); the TPM 206 would initially select the rightmost (or equal rightmost) glyph at 604 then iterate through the glyphs from right to left; the TPM 206 would determine that an open text area should be closed at 606 if the glyph's expanded bounding box max x was less than the open text area's bounding box min x.

At 410 of text element determination process 400 described above, the TPM 206 determines whether any of the text areas determined at 408 should be merged. This process will be described with reference to FIG. 8.

At 802, the TPM 206 selects an unprocessed text area to be the next subject text area. Over the course of process 410 the TPM 206 selects each text area to be a subject text area. The text areas may be selected to be subject text areas in any order.

At 804, the TPM 206 determines if there are any text areas that are compatible with the subject text area selected at 802 and that have not yet been compared to the subject text area.

As described above, text areas are generated from glyph sets (and all glyphs in a given glyph set have the same grouping attribute values). Accordingly, a selected subject text area does not need to be considered against text areas that were generated from the same glyph set as the subject text area.

The TPM 206 determines compatibility between text areas with reference to defined compatibility criteria. In the present example, the define compatibility criteria is rotation: i.e. one text area will be compatible to another text area if it (or its member glyphs) has the same rotation. In this case text areas with the same rotation will be compatible even if they have different font styles and or font sizes.

Alternative compatibility criteria can be defined. For example, compatibility criteria may include or be based on) text areas (or member glyphs thereof): having the same rotation (as described above); having rotations within a defined threshold of each other (e.g. within x degrees); having the same font size; having font sizes within a defined threshold of each other (e.g. within x points); being the same font type; being in the same font family; and/or compatibility criteria based on alternative parameters available to the TPM 206.

If, at 804, the TPM 206 determines there is at least one compatible text area that has not yet been compared to the subject text area processing proceeds to 806. Otherwise processing proceeds to 812.

At 806, the TPM 206 selects a compatible text area that has not yet been compared to the subject text area. The selected compatible text area will be referred to as the comparison text area. Compatible text areas can be selected in any order.

At 808, the TPM 206 determines whether one of the text areas encompasses the other text area. In one embodiment, this determination may be made by determining whether the subject text area (selected at 802) fully contains the comparison text area (selected at 806) or vice versa. This comparison is made by comparing the bounding boxes of the subject and comparison text areas. The TPM 206 can make this determination, for example, by use of a library function that takes two rectangles (or relevant coordinates thereof) and returns a value indicating whether one contains the other.

In certain embodiments, when determining whether one text area encompasses the other text area the TPM 206 calculates an expanded text area bounded box for the larger of the two text areas and determines whether the original (unexpanded) bounding box of the other of the two text areas is contained within that expanded text area bounding box. The TPM 206 may calculate an expanded text area bounding box in a similar manner to calculating an expanded glyph bounding box (described above), for example by applying a scaling factor to the original text area bounding box (or separate horizontal and vertical scaling factors to the original text area bounding box).

If the TPM 206 determines that the subject text area encompasses the comparison text area or vice versa processing continues to 810. If not, processing returns to 804 to determine whether any other compatible text areas need to be compared to the current subject text area.

At 810, the TPM 206 merges the subject and comparison text areas. This can be achieved in a similar manner to that described above with reference to operation 624, for example by creating a new text area; assigning the glyphs of the subject and comparison text areas to it; then deleting the subject and comparison text areas. Once the text areas have been merged processing returns to 804.

At 812, the TPM 206 has determined that any/all text areas that are compatible with the current subject text area have been compared to the current subject area. In this case the TPM 206 determines whether there are any text areas that have not been selected as a subject text area. If so, processing returns to 802 to select a new subject text area. If not, processing proceeds to 814.

At 814, the TPM 206 generates common glyph attributes for merged text areas. In the present example this involves determining an attribute for which glyphs in the merged set have different values, determining a common value for that attribute, and associating the common attribute value with the glyphs of the merged set.

By way of example, if a merged set has glyphs in multiple different font sizes the TPM 206 may calculate a new, common font size for all glyphs in the merged set. The common font size may, for example, be calculated to be the median font size of the existing font sizes. As another example, if a merged set has glyphs of different font types, the TPM 206 may calculate a new common font type to be the most prevalent font type of the glyphs in the merged set.

In one implementation the TPM 206 associates the common attribute value with each glyph in the merged set as an additional glyph attribute value (i.e. The common value does not overwrite the glyph's original value for that attribute). In alternative implementations, the TPM 206 overwrites the glyph's original attribute value with the common value.

Following generation of common glyph attributes (if this processing is performed), process 410 ends.

In certain embodiments operation 814 (and indeed process 410 as a whole) may be omitted.

Figures 10, 11:
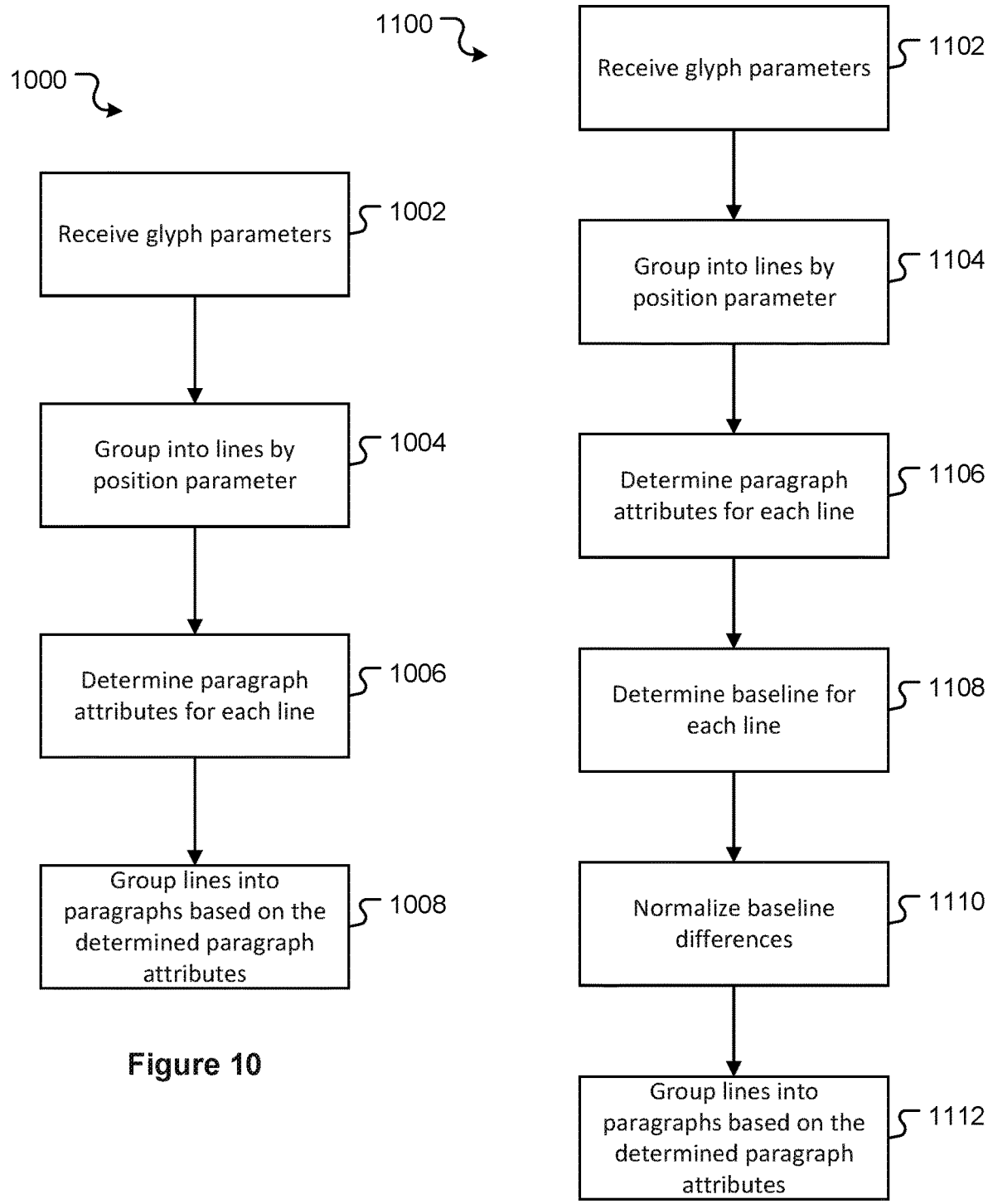
FIG. 10 is a flowchart depicting operations involved in determining paragraphs in a text area.
FIG. 11 is a flowchart depicting operations involved in determining paragraphs in a text area.

Turning to FIG. 10, a process 1000 for determining paragraphs within a text area will be described. The area of text contains a plurality of glyphs.

As with text area determination process 400 described above, the paragraph determination process 1000 will be described as being performed by the text processing module (TPM) 206. Once again, however, processing could be performed by an alternative module, application, or group of modules/applications.

In some embodiments the text area has been determined according to the text area determination process 400 as described above (or an adaptation thereof). In this case, one or more text areas is defined, each text area having a text area bounding box and one or more glyphs associated with it. The area within a text area's bounding box is the area of text processed in accordance with FIG. 10. In other embodiments the text area is different, for example a complete page of text.

Identifying lines of text and paragraphs of text within a text area may provide additional advantages over detecting a text area alone. For example, for editing activities in which the margins of the text area are changed, text that has been identified as a single paragraph may be automatically formatted to fit the changed text area.

At 1002, the TPM 206 receives the data defining the plurality of glyphs within the area of text. The data defining the glyphs includes data defining position information for each of the glyphs and may also include rotation information and boundary information of a bounding box for the glyph. The data may be received by reading it from memory, for example transient or non-transient memory. The data may have originated from a source document. For example the ISO 32000 (portable document format (PDF) specification) includes data defining glyph characteristics. Alternatively, if the required data is not present in the source document, it may be determined based on other data within the source document and/or based on data outside of the source document, for example a library of fonts and their characteristics, which can be compared to the glyphs in the source document.

At 1004, the set of glyphs in the area of text is grouped into lines based on a parameter in the data defining the position of the glyph. For example, with reference to a process for horizontal lines of text, a vertical position parameter of the glyph may be used to group the glyphs into lines. The glyphs may be placed into a sorted list of ascending (or descending) vertical position. A new line is then identified by a relatively large increase in vertical position, in comparison to the zero or small difference that will occur with text in the same line. The relatively large increase may be a fixed value or a value determined based on another parameter of the text, for example set equal to the font size or set to a value based on the font size.

At 1006, the paragraph related attributes of each line are determined. The determined paragraph related attributes may include one or more of font style, font size, character spacing and the inferred presence of a manual line break. The determined paragraph related attributes may also include character directionality. In embodiments that utilise directionality, bidirectional text may be taken account of and either grouped into the same paragraph or used to identify different paragraphs based on the context in which it is used.

At 1008, lines are grouped into paragraphs based on the determined paragraph related attributes. For example when two adjacent lines are determined to match, due to having the same font style, font size, character spacing and directionality attributes, they are grouped together in the same paragraph. If there is third line below those two lines in the text area, then the third line is also grouped into the same paragraph if it also matches by having the same font style, font size, character spacing and directionality attributes. The matching process continues for any fourth and subsequent lines in the text area. When a line does not match due to having a different attribute in any one of the same font style, font size, character spacing and directionality attributes from the existing paragraph attributes, then this line is allocated to a new paragraph. For subsequent lines the matching process is with reference to the attributes of the new paragraph. The process continues until all lines in the text area have been grouped. It will be appreciated that a paragraph may consist of one line, if the preceding and following lines do not match.

FIG. 11 shows a process 1100 for determining paragraphs within a text area containing a plurality of glyphs. Operations 1102, 1104, 1106, and 1112 are the same as operations 1002, 1004, 1006 and 1008 of FIG. 10 respectively and therefore will not be described again to avoid repetition. FIG. 11 includes a process of adding blank lines, to normalize line spacing within the area of text. Normalizing the spacing in this manner may result in the determined paragraphs more closely matching the editable document that created the source document and/or may assist in producing a more readily editable document based on the source document.

At 1108, the TPM 206 determines a baseline for each line. As described later herein, the baseline may be determined based on the content box for the line.

At 1110, the line spacing is then normalized. Small variations in line spacing between adjacent baselines are reset to a common value, for example the average value. Larger variations are between adjacent baselines are retained, subject to any small variation due to resetting to the common value with the next adjacent baselines. In some embodiments the normalization process includes entering additional lines according to one or more line addition processes. The one or more line addition processes may assist to normalize the baseline differences between adjacent lines by inserting one or more additional blank lines into the area of text, between two existing lines that include one or more glyphs. Example line addition processes are described below.

Figure 12:
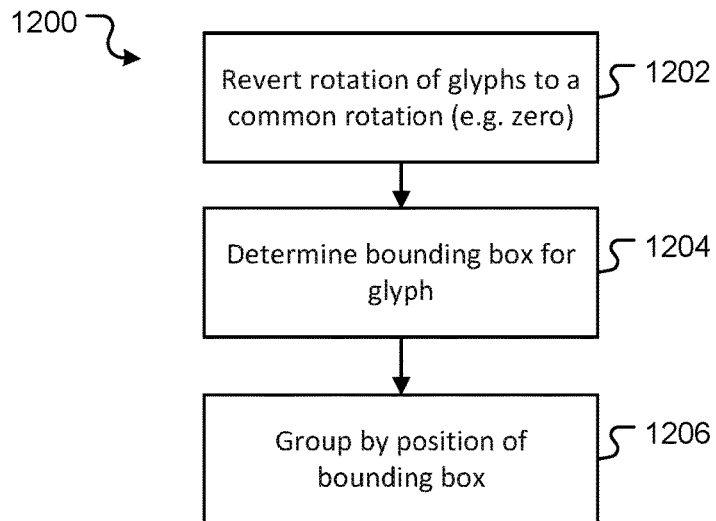
FIG. 12 is a flowchart depicting operations involved in grouping glyphs into lines.

FIG. 12 shows an example process 1200 for grouping glyphs into lines based on a parameter in the data defining the position of the glyph. Operations 1004 and 1104 may include the process of FIG. 12 or may include operations 1204 and 1206 (and not 1202) of the process of FIG. 12.

At 1202, where the glyphs include a rotation parameter, these are reverted to a common rotation, conveniently a rotation of zero. After the rotation reversion of operation 1202, at 1204 a bounding box for each glyph in the text area is determined. The bounding box for each glyph may, for example, be calculated as described with reference to operation 406 (FIG. 4 above). At 1204, the position of the glyph, for example the vertical position when addressing horizontal lines, is then based on the bounding box. For example, the vertical position of the glyph used for the purposes of grouping glyphs into lines may be the maximum vertical position of the bounding box.

Other parts of the bounding box may be used, for example the minimum vertical position or the vertical mid-point.

Operation 1110 may include inserting one or more additional lines into a text area. The text area may include lines at variable relative spacing, including smaller and larger gaps. Where the variable spacing of a larger gap is a multiple of the spacing of a smaller gap, then additional lines matching the multiple may be inserted.

For example, seven lines within the area of text may be spaced apart, in order by: {100, 100, 200, 100, 300, 100}, in any appropriate unit. By adding one additional line between lines three and four and two additional lines between (original) lines five and six, the line spacing is normalised. The new set of lines has ten lines in total, three of which are blank lines.

Figure 13:
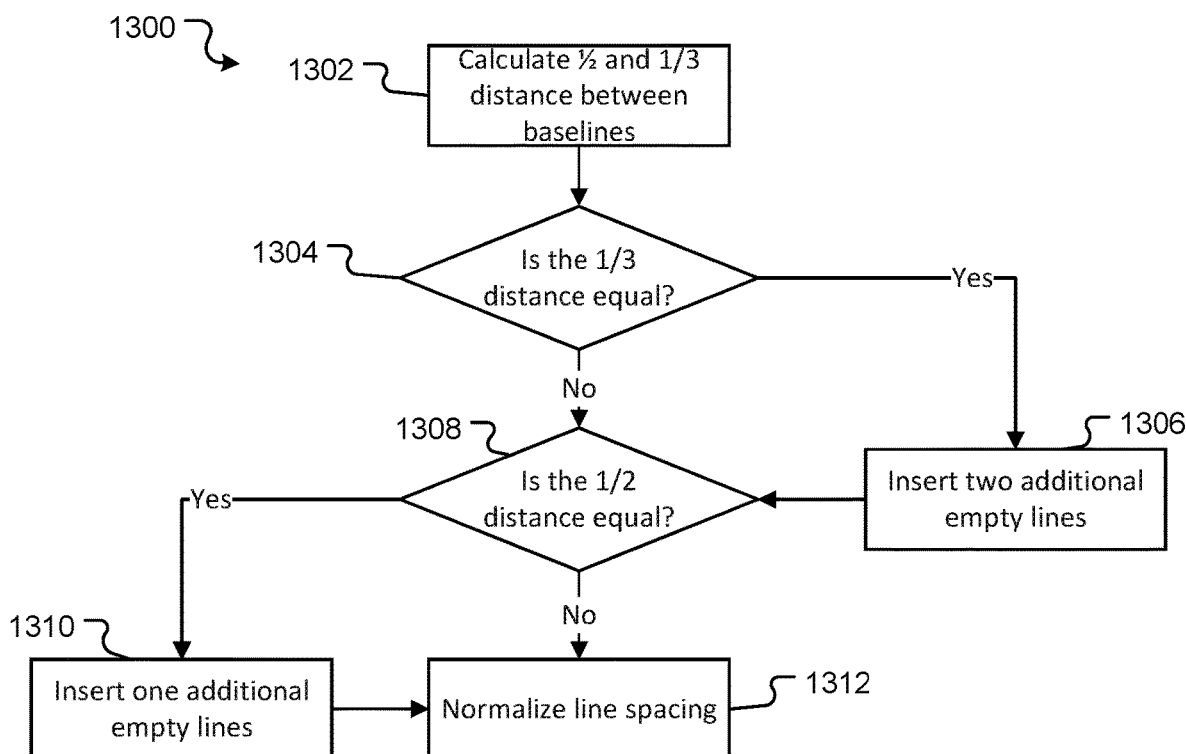
FIG. 13 is a flowchart depicting operations involved in inserting additional lines into a text area.

FIG. 13 shows an example process 1300 for inserting one or more additional lines into a text area. The additional lines may suitably be blank or empty lines, for instance in effect only a new paragraph symbol. Operation 1110 may include the process of FIG. 13. The process includes determining, for each adjacent baseline pair, the distance (D) between the baselines and calculating D/2 and D/3. If D/2 or D/3 matches a distance between two other lines, then one or two additional lines are added. The matching may accommodate for slight variations in line separation, rather than requiring the line spacing between one pair of lines to equal D/2 or D/3. The amount of variation allows may match that required for normalization of the spacing. Alternatively the line spacing may be normalised to multiples of each other prior to completing process 1300 or a similar process.

At 1302, the TPM 206 determines, for each two adjacent lines in the text area, a difference in the baselines. The difference in baselines is a measure of the vertical distance between the baselines of adjacent lines of text, when dealing with horizontal lines of text.

At 1304 the TPM 206 determines whether D/3 for any pair of lines matches the distance between any of the other lines in the area of text. If so, then at 1306 two additional empty lines are inserted in the space between that pair of lines. In a like process, operation 1308 the TPM 206 determines whether the half distance to the adjacent baseline matches the distance between any of the other lines and if so, at 1310 an additional empty line is added to the space between that pair of lines. The inserted blank lines have a font size set to the maximum size of the font of the upper line in the pair.

In alternative embodiments the process may also insert three or more lines (e.g. by determining and acting on D/4, D/5 etc or by an equivalent process).

At 1312 a normalization of the line spacing is completed after any additional lines have been inserted in operations 1306 and 1310. As per the normalization operation 1110, small variations in line spacing between adjacent baselines are reset to a common value, for example the average value. Larger variations are between adjacent baselines are retained, subject to any small variation due to resetting to the common value with the next adjacent baselines. It will be appreciated that inserting blank lines into the larger gaps may assist with this normalization process. However, in other embodiments normalization occurs without adding blank lines.

Figures 14, 15:
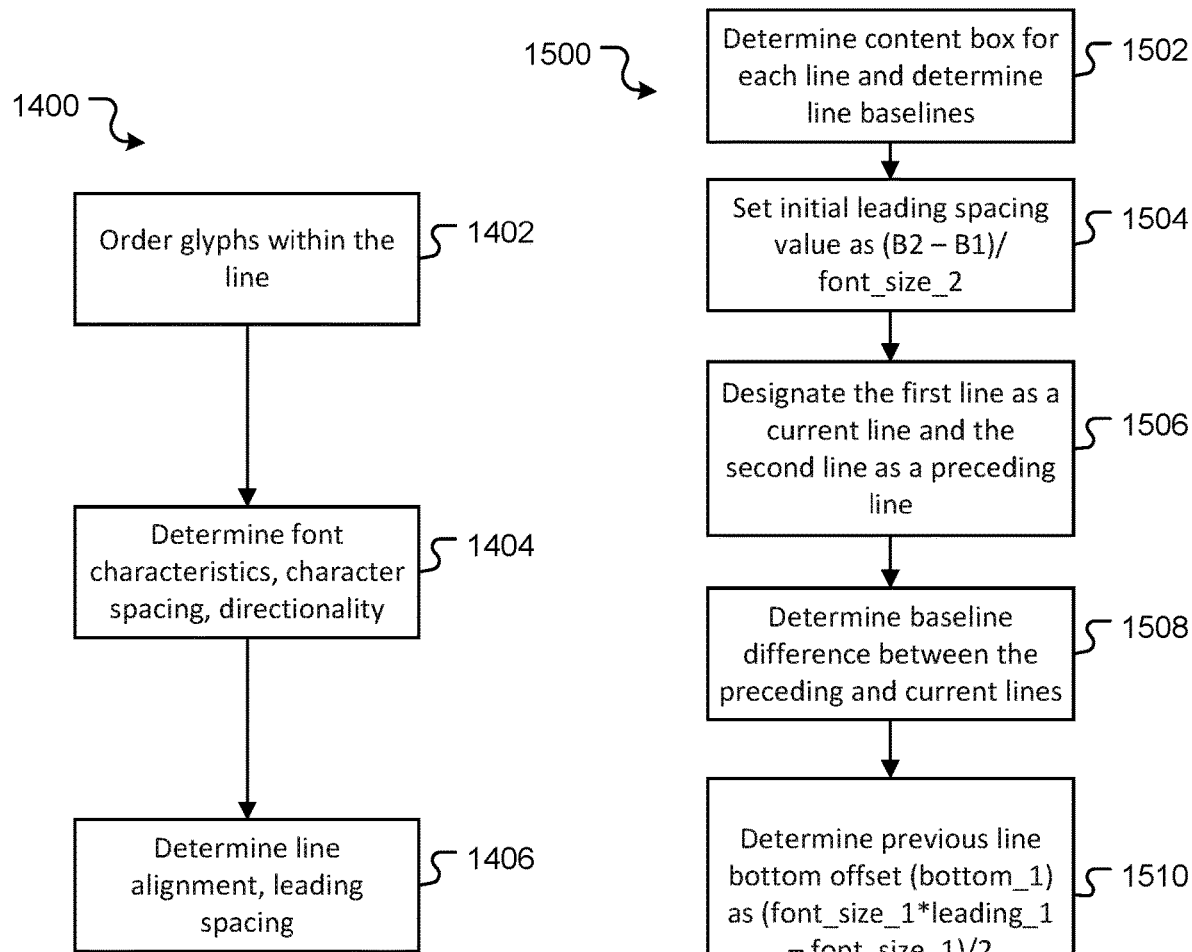
FIG. 14 is a flowchart depicting operations involved in determining paragraph attributes for a line.
FIG. 15 is a flowchart depicting operations involved in determining leading spacing for a line within an area of text.

FIG. 14 shows an example process 1400 for determining the paragraph attributes for each line. Operations 1006 and 1106 may include the process of FIG. 14. At 1402 the text positions of the glyphs are ordered within each line identified previously (e.g. At 1004 or 1104). For horizontal lines of text, the ordering is based on the horizontal position information of the glyph as opposed to the vertical information used for grouping the glyphs into lines. The directionality of the text may also be taken into account, for example when the line contains Latin and/or Arabic characters.

At 1404 a set of paragraph attributes is determined for each line. The font type and size may be read from the source document. The character spacing may be determined based on the horizontal position of the glyphs. The horizontal position of the glyphs may be determined with reference to the position of a bounding box for the glyphs in the line, for example the leftmost side of the bounding box. The direction of the text (e.g. left to right or right to left) is also determinable, for example based on the presence of certain classes of characters. When the source document does not include metadata defining one or more of the paragraph attributes, then they may be either omitted from consideration or determined from an analysis of the source document, for example through pattern recognition for the font characteristics and calculation of the character spacing. Where there a differences within a line in one or more of these attributes, for example when a single line includes text with two different font styles, then in some embodiments a line may be determined to have a paragraph attribute that is a mode attribute of the glyphs in the line.

At 1406 another set of paragraph attributes are determined. These relate to the overall line characteristics, in contrast to operation 1404 which focussed on characteristics of the glyphs within the line.

Operation 1406 may include determining the line alignment for each line. The line alignment may be for example, left aligned, right aligned, centred or justified. The alignment can be inferred by the TPM 206 by determining the distance from the bounding box of the text area containing the glyphs with the outermost glyphs in the lines. For example left aligned text will have a constant or substantially constant horizontal position for the leftmost glyph and a variable horizontal position for the rightmost glyph. Right aligned text will be the reverse. Operation 1406 may therefore include looking at two adjacent lines of text and identifying what category of line alignment they are consistent with. The next adjacent line may then be considered and identified as consistent with the same category, in which case all three lines are determined to have that line alignment and so forth for any additional lines in the area of text. If the next adjacent line (e.g. the next line below) is not consistent with the category, it is considered as a different category and that new category may be determined based on that line and the next line below that line if there is one. Categorisation of line alignment may instead be performed on a line-by-line basis without regard to adjacent lines, with a disadvantage in accuracy.

Operation 1406 may include determining a measure of the spacing of the lines within the text area. A suitable measure of the line spacing is the leading spacing for a horizontal line. As used herein, the leading spacing of a horizontal line is the vertical size of the line box over (i.e. divided by) the (vertical) font size. A process for determining the line box and the leading spacing is described below with reference to FIG. 15.

As described with reference to operations 1008 and 1112, a determination of grouping into paragraphs may be based, at least in part, on the paragraph attributes. For example, a change in any one of the paragraph attributes between identified lines of glyphs may be used to indicate a new paragraph.

FIG. 15 shows a process 1500 for determining the leading spacing for each line within the area of text. The following description also refers to the diagrammatic representation of two adjacent lines of text of FIG. 17. The font size for calculating the leading spacing may be the size of the line's content box. As described previously, the content box for a line may be defined by the minimum box that encompasses all the bounding boxes for the glyphs within a line. Operation 1502 includes determining the content box for each line. Operation 1502 also includes determining the baseline for each line (if not already determined, for example at 1106). The baseline may be set with reference to the content box, for example at or relative to the lower edge of the content box.

Figure 17:
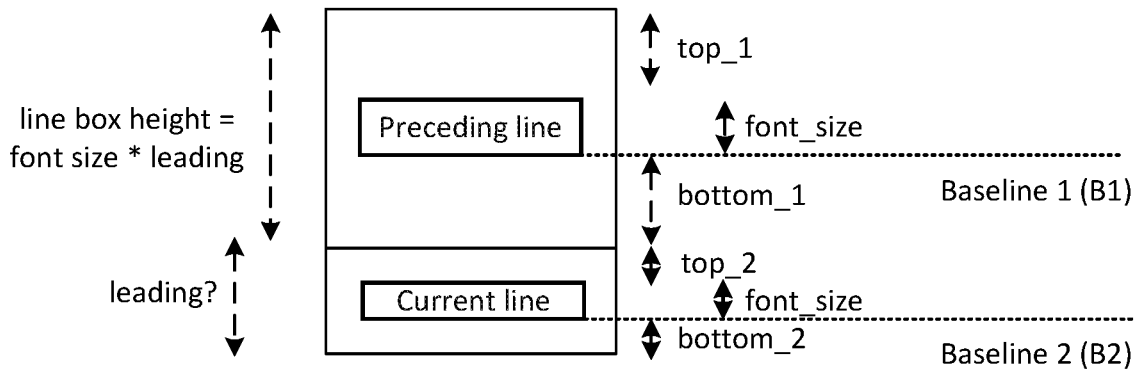
FIG. 17 provides a representation of a preceding line and a current line.

The first line in a block of text containing a plurality of lines does not have a preceding line, so reference cannot be had to the preceding line for determining the first line's line box. To address this issue in some embodiments, at 1504 an initial leading spacing value is set as the difference between baselines between first and second line divided by the font size of the second line (initial leading=(B2−B1)/font_size_2). At 1506, the second line in the plurality of lines is designated as a preceding line (to the first line). This designation involves in effect copying the second line and (virtually) placing the copy above the first line at the same distance above the first line as the second line is below the first line. For example, the gap between the content box of the virtual preceding line and the first line and the gap between the content boxes of the first and second lines is set to be the same. Referring to FIG. 17, at 1506 the first line is therefore designated as a current line or in other words the line for which the line box (and subsequently the leading spacing) is being determined and the virtual second line is the preceding line. The operations 1508 onwards then determine the leading spacing for the first line. For the second and subsequent lines operations 1508 onwards may be completed.

At 1508 a difference between the position of the baseline of the preceding line and the position of the baseline of the current line is determined. As previously described, this may be the difference between the locations of the lower edge of the respective content boxes.

At 1510 the previous line bottom offset is determined (bottom_1=(font_size_1 leading_1)−font_size_1))/2). Given the line height and font size for the previous line are known by subtracting the font size from the line box height (font_size_1 leading_1) to provides the top and bottom difference between the line box height and the content box height. Half of that is the bottom offset. At 1512 a current line top offset is determined (top_2=DIFF−bottom_1−font_size_2). In other words, the current line top offset is determined by subtracting the bottom empty space from the previous line (bottom_1=(font_size_1*leading_1)/2) and current line font size (font_size_2) from the baseline difference (DIFF). FIG. 17 shows a representation of a preceding line and a current line. The current line top offset is designated "top_2" in the FIG. 17 and is the distance between the top of the content box and the top of the line box.

At 1514, the leading spacing for the current line is determined based on the current line top offset. The line box height for the current line is calculated as the font size (e.g. size of the content box) for the current line plus two times the previously determined current line top offset. The leading spacing for the current line is then the line box height divided by the font size. The preceding and current lines are then incremented and the process repeated until all lines in the area of text have been processed.

In some embodiments the leading spacing is determined according to a process including:
 a. Calculating the baseline difference between previous and current line (DIFF)
 b. Calculating the previous line bottom offset (bottom_1= (font_size_1 leading_1)−font_size_1))/2). Given the line height and font size for the previous line are known, subtract the font size from the line box height (font_size_1*leading_1) to get the top and bottom difference between the line box height and the content box height. Half of that is the bottom offset.
 c. Calculating the current line top offset (top_2=DIFF− bottom_1−font_size)—Subtract bottom empty space from previous line (bottom_1=(font_size leading_1)/2) and current line font size (font_size_2) from the baseline difference (DIFF).
 d. Calculating the current line box height—font size+ 2*top_2 (calculated in Step b).
 e. Calculating the leading spacing for the current line— ratio between line box height and font size (line_box_height_2/font_size_2).

Figure 16:
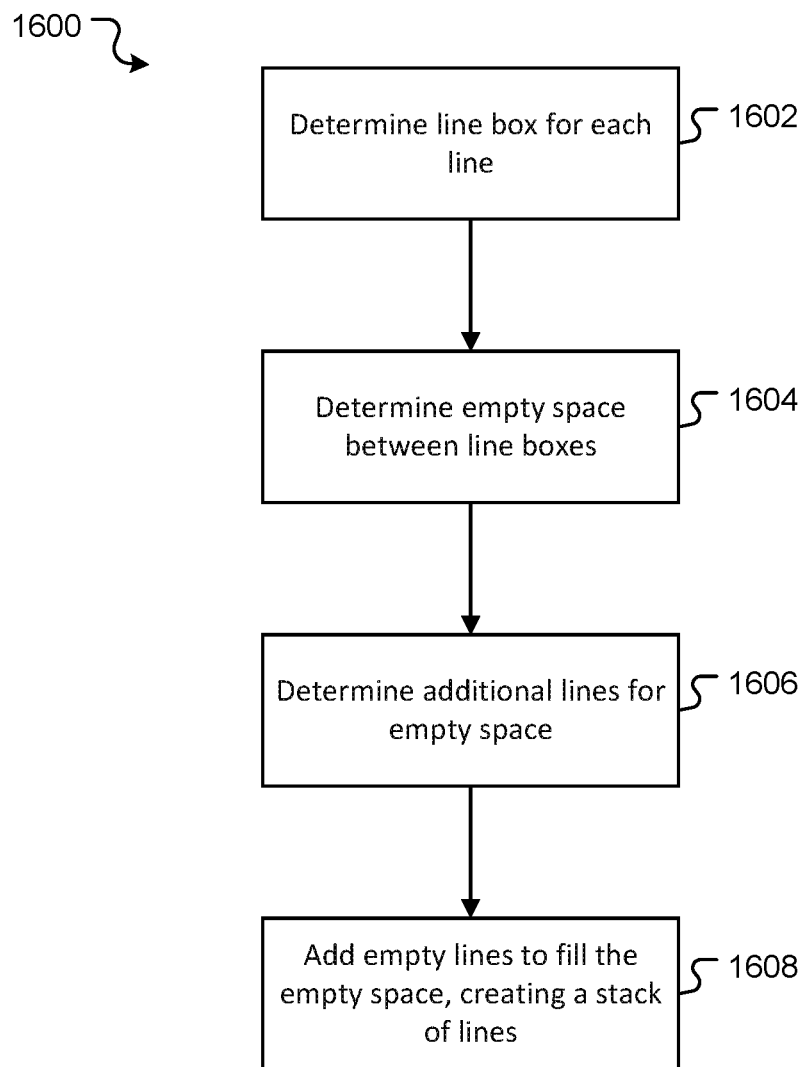
FIG. 16 is a flowchart depicting operations involved in inserting one or more additional lines into a text area.

FIG. 16 shows an example process 1600 for inserting one or more additional lines into a text area. The additional lines may suitably be blank or empty lines, for instance in effect only a new paragraph symbol. Operation 1110 may include the process of FIG. 16, in addition to or instead of the process of FIG. 13.

At 1602 the line box is determined for each line in the area of text. Determination of the line box may be completed according to a process described with reference to FIG. 15, where the line box has a maximum size. For example, the leading spacing may have a maximum value that constrains the process of determining the line boxes. Where the leading spacing determined based on the baseline difference as per the process of FIG. 15 exceeds the maximum, it may be set to a value within the maximum, for example at the maximum allowable value. For lines of text within an area that are spaced apart to an extent that cannot be bridged due to the constraint on the line box size, then empty spaces will result between the line boxes.

At 1604 the amount of empty space between the line boxes is determined and At 1606 the number of additional lines to insert into that empty space is determined. The number of additional lines may be the maximum number that can be added at a minimum size. The minimum size may be pre-set or predetermined. An example minimum size may be a leading spacing of 0.5 (and therefore based on the font size, although other measures need not be). The font size for the empty lines may be set equal to the font size of the adjacent lines, or if there is a difference to the font size of one of them (e.g. whichever has the smaller size or the font of the upper line) or a mathematical combination of them both (e.g. the average).

At 1608 a continuous stack of lines is created by adjusting the leading spacing of the blank lines as required so that they fill the empty space. In some embodiments this will involve an equal increase in the leading spacing of the blank lines. Any remaining space due to finite resolution may be either left as empty space or filled by increasing the size of the line box or line boxes of a subset of the blank lines.

Figure 18:
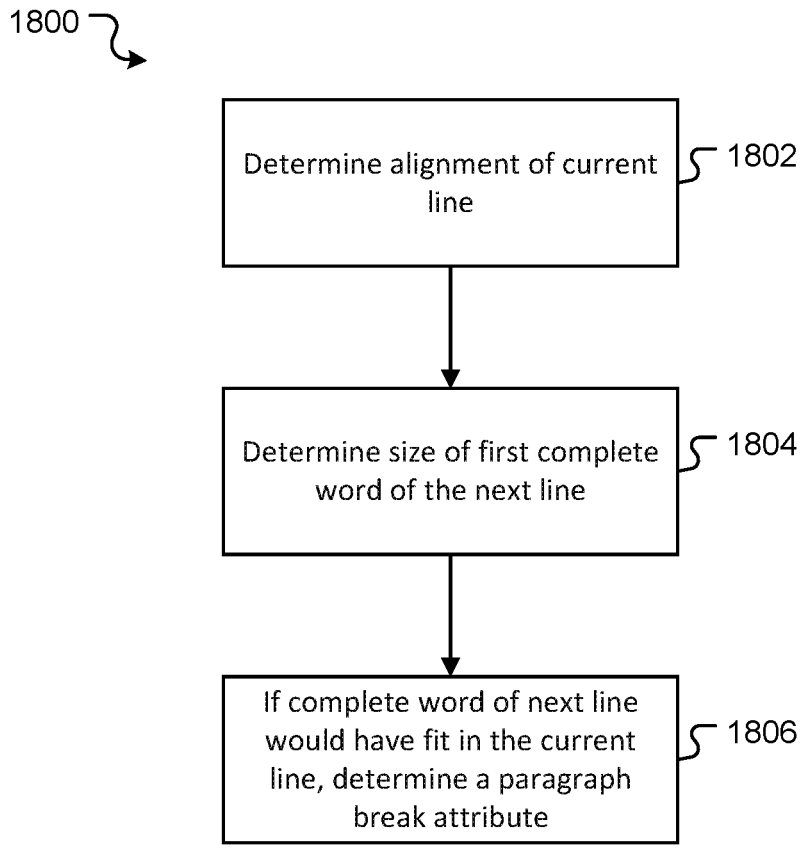
FIG. 18 is a flowchart depicting operations involved in identifying a paragraph attribute for use in determining the presence of a location to separate text into paragraphs.

FIG. 18 shows a further process 1802 for identifying a paragraph attribute for use in determining the presence of a location to separate text into paragraphs. The paragraph attribute in this process is designed around the possibility of manual line breaks in the original text for the source document. At 1802, the alignment is determined for a current line. The alignment may be determined according to a process described with reference to operation 1406. If that process has previously been completed, then it need not be repeated.

At 1804, the size of a first complete word in the immediately following (i.e. next) line is determined. The size may be the number of characters from the commencement of the text to the first space character. At 1806 it is determined whether the first complete word in the next line would have fit in the current line. If so, this paragraph attribute indicates a new paragraph or towards a new paragraph if a combination of attributes is required to trigger a new paragraph. If the next line would not have fit, then this paragraph does not indicate a new paragraph (but a new paragraph may or may not be indicated by the other attributes). The indication of this attribute is therefore considered as part of operation 1008 or 1112.

The process for the determination of fit is based on the determined alignment for the line. For example for a left aligned line, the determination may be whether there is sufficient space between the end of the text on the line and the edge of the bounding box of the area of text to hold the word. For a justified line, consideration will be given to the spacing between the words on the line and whether they could be reduced to a value at or above the minimum so as to accommodate the word. In some embodiments the space considered for a right aligned, left aligned or centred line may be indented slightly from the bounding box of the area of text.

Additional examples of specific feature combinations taught within the present disclosure are set out in the following numbered clauses:

Clause 1. A computer implemented method including:
accessing, by a computer processing system including a processing unit, portable document format (PDF) data defining a plurality of glyphs;
sorting, by the processing unit, the plurality of glyphs into one or more glyph sets;
calculating, for each glyph, an expanded glyph bounding box;
processing each of the one or more glyph sets to determine, for each glyph set, one or more text areas, each text area being associated with one or more glyphs, and wherein processing a given glyph set to determine one or more text areas includes:
identifying distinct groups of glyphs from the particular glyph set, each distinct group of glyphs including one or more glyphs from the particular glyph set which have collectively overlapping expanded bounding boxes; and associating each distinct group of glyphs from the given glyph set with a separate text area.

Clause 2. The computer implemented method clause 1, wherein the expanded bounding boxes of glyphs from a given glyph set that have been associated with one text area do not overlap with expanded bounding boxes of other glyphs from the given glyph set.

Clause 3. The computer implemented method of clause 1 or clause 2, wherein each glyph set has one or more set values, and wherein sorting the plurality of glyphs into the one or more glyph sets includes, for each glyph from the plurality of glyphs:
determining one or more grouping attribute values for the glyph; and
associating the glyph with a glyph set that has one or more set attribute values that correspond to the particular glyph's one or more groping attribute values.

Clause 4. The computer implemented method of clause 3, wherein the one or more grouping attribute values include one or more of: a font type attribute value; a font size attribute value; a rotation attribute value.

Clause 5. The computer implemented method of any one of clauses 1 to 4, further including calculating a bounding box for each text area, the bounding box for a particular text area calculated based on the expanded bounding boxes of the glyphs which have been associated with the particular text area.

Clause 6. The computer implemented method of any one of clauses 1 to 5, wherein calculating the expanded glyph bounding box for a given glyph includes:
calculating an initial bounding box based on the PDF data; and
applying an expansion factor to the initial bounding box to calculate the expanded bounding box.

Clause 7. The computer implemented method of clause 6, wherein applying an expansion factor to the initial bounding box includes applying a horizontal expansion factor to horizontally expand the initial bounding box and applying a vertical expansion factor to vertically expand the initial bounding box, the horizontal expansion factor being different to the vertical expansion factor.

Clause 8. The computer implemented method of clause 6 or clause 7, wherein the initial bounding box is a glyph space bounding box and calculating the expanded glyph bounding box further includes transforming the glyph space bounding box to a document space bounding box, the document space bounding box being in a coordinate space of a document the glyph is to be rendered in.

Clause 9. The computer implemented method of any one of clauses 6 to 8, wherein the expanded glyph bounding box for a given glyph includes data from which a set of expanded glyph bounding box coordinates can be determined, the set of expanded glyph bounding box coordinates including a minimum x coordinate, a maximum x coordinate, a minimum y coordinate, and a maximum y coordinate.

Clause 10. The computer implemented method of clause 9, wherein the minimum x coordinate and maximum x coordinate are based on a glyph width defined in the PDF data and associated with the glyph.

Clause 11. The computer implemented method of clause 9 or clause 10, wherein the minimum y coordinate and maximum y coordinate are based on a glyph y coordinate and a glyph height, the glyph y coordinate being calculated based on a bounding box y value and a descent value that are defined in the PDF data and associated with the glyph.

Clause 12. The computer implemented method of clause 11, wherein the glyph height is based on a CapHeight value defined in the PDF data and associated with the glyph.

Clause 13. The computer implemented method of clause 11, wherein the glyph height is based on a bounding box height value defined in the PDF data and associated with the glyph and the descent value defined in the PDF data and associated with the glyph.

Clause 14. The computer implemented method of any one of clauses 1 to 13, wherein:

processing each of the one or more glyph set to determine, for each glyph set, one or more text areas includes determining a first text area associated with glyphs from a first text set and determining a second text area associated with glyphs from a second text set; and
the method further includes:
  determining if the first text area and the second text area are compatible;
  in response to determining that the first text area and the second text area are compatible, determining if the first text area encompasses the second text area; and
  in response to determining that the first text area fully contains the second text area, merging the first and second text areas into a single text area by:
    associating the glyphs associated with the first text area with the single text area; and
    associating the glyphs associated with second third text area with the single text area.

Clause 15. The computer implemented method of clause 14, wherein the first text area and second text area are determined to be compatible if they are associated with glyphs that have the same rotation.

Clause 16. The computer implemented method of clause 14 or clause 15, further including:
  determining a particular attribute for which glyphs associated with the single text area have different values;
  generating a common value for the particular attribute; and
  associating the common value with the glyphs associated with the single text area.

Clause 17. The computer implemented method of clause 16, wherein the particular attribute is a font size attribute; and generating a common value includes determining a font size based on the font sizes of the glyphs associated with the single text area.

Clause 18. The computer implemented method of clause 16, wherein
  the particular attribute is a font type attribute; and
  generating a common value includes determining a font type based on the font types of the glyphs associated with the single text area.

Clause 19. A computer implemented method including:
receiving, at a computer processing system including a processing unit, data for an area of text of a document, the area of text containing a plurality of glyphs, each glyph associated with position information defining a position of the glyph in the document; and
by the processing unit:
  grouping the glyphs into a plurality of lines based on the position information;
  for each line determining one or more paragraph attributes, wherein a difference in the one or more paragraph attributes between different lines indicates a likelihood that the different lines are in different paragraphs;
  responsive to the determination of the one or more paragraph attributes, grouping the plurality of lines into one or more paragraphs; and
  generating an editable document containing text in paragraphs that corresponds to the one or more paragraphs.

Clause 20. The computer implemented method of clause 19, further including, by the processing unit, prior to grouping the plurality of lines into one or more paragraphs:
  determining a baseline for each of the plurality of lines; and
  normalizing differences between the determined baselines.

Clause 21. The computer implemented method of clause 20, wherein normalizing the differences between the determined baselines includes determining that adjacent lines in the plurality of lines are spaced apart beyond a threshold amount and responsive to the determination, adding one or more blank lines between the adjacent lines.

Clause 22. The computer implemented method of clause 21, wherein the plurality of lines are horizontal lines and the method includes determining a font of the one or more blank lines as equal to a font of an upper line Clause 23. The computer implemented method of any one of clauses 19 to 22, wherein grouping the glyphs into a plurality of lines based on the position information includes determining a bounding box for each glyph based on the position information and grouping the glyphs based on positions of the determined bounding boxes.

Clause 24. The computer implemented method of clause 23, further including by the processing unit:
  reverting a rotation parameter of the glyphs in the data to a common rotation prior to determining the bounding box for each glyph.

Clause 25. The computer implemented method of any one of clauses 19 to 24, wherein the one or more paragraph attributes include at least one of: font style of the glyphs in the line; font size of the glyphs and character spacing of the glyphs.

Clause 26. The computer implemented method of any one of clauses 19 to 23, wherein:
  the one or more paragraph attributes include at least two of: font style of the glyphs in the line; font size of the glyphs and character spacing of the glyphs; and
  grouping the plurality of lines into one or more paragraphs includes allocating adjacent lines to different paragraphs if any one of the two or more paragraph attributes is different between the adjacent lines.

Clause 27. The computer implemented method of any one of clauses 19 to 26, wherein the one or more paragraph attributes includes a leading spacing.

Clause 28. The computer implemented method of any one of clauses 19 to 27, further including by the one or processors determining an alignment of each of the plurality of lines relative to the area of text, wherein the one or more paragraph attributes includes the determined alignment.

Clause 29. The computer implemented method of any one of clauses 19 to 28, further including by the processing unit determining that a complete first word in a first line of the plurality of lines would fit within a second line that is an adjacent and preceding line in the plurality of lines and in response grouping the first line into a different paragraph to the second line.

Clause 30. The computer implemented method of any one of clauses 19 to 29, further including determining the area of text according to the computer implemented method of any one of clauses 1 to 18

Clause 31. A computer processing system including:
a processing unit;
a communication interface; and
non-transitory computer-readable storage medium storing sequences of instructions, which when executed by the processing unit, cause the processing unit to perform a computer implemented method according to any one of clauses 1 to 30.

Clause 32. A non-transitory storage medium storing instructions executable by a processing unit to cause the processing unit to perform a computer implemented method according to any one of clauses 1 to 30.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, operations, steps, or elements.

Unless required by context, the terms "first", "second", etc. are used to differentiate between various elements and features and not in an ordinal sense. For example, a first glyph set could be termed a second glyph set, and, similarly, a second glyph set could be termed a first glyph set, without departing from the scope of the described examples.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
    accessing, by a computer system including a processing unit, portable document format (PDF) text data, the PDF text data defining a plurality of glyphs by way of data specifying glyph attribute values;
    sorting, by the processing unit, the plurality of glyphs into a plurality of glyph sets, wherein sorting the plurality of glyphs into the plurality of glyph sets includes:
        associating a first subset of glyphs from the plurality of glyphs with a first glyph set, wherein the first glyph set has an associated first set of grouping attribute values and wherein the association of the first subset of glyphs with the first glyph set is based on the glyph attribute values of the first subset of glyphs corresponding to the first set of grouping attribute values; and
        associating a second subset of glyphs from the plurality of glyphs with a second glyph set, wherein the second glyph set has an associated second set of grouping attribute values and wherein the association of the second subset of glyphs with the second glyph set is based on a determination by the processing unit that the glyph attribute values in the second subset of glyphs correspond to the second set of grouping attribute values, the second set of grouping attribute values being different to the first set of grouping attribute values;
    calculating, for each glyph, an expanded bounding box, wherein a different expanded bounding box is calculated for each glyph by manipulating an initial bounding box of each glyph;
    processing the first glyph set to determine one or more text areas, each text area being associated with one or more glyphs, and wherein processing the first glyph set to determine the one or more text areas includes:
        identifying a first distinct group of glyphs from the first glyph set, the first distinct group of glyphs including one or more glyphs from the first glyph set which have collectively overlapping expanded bounding boxes;
        associating each glyph in the first distinct group of glyphs with a first text area; and
        identifying a second distinct group of glyphs from the first glyph set, the second distinct group of glyphs including one or more glyphs from the first glyph set which are not in the first distinct group of glyphs and which have collectively overlapping expanded bounding boxes; and
        associating each glyph in the second distinct group of glyphs with a second text area.

2. The computer implemented method of claim 1, wherein the expanded bounding boxes of glyphs that have been associated with the first text area do not overlap with the expanded bounding boxes of glyphs that have been associated with the second text area.

3. The computer implemented method of claim 1, wherein the first set of grouping attribute values includes one or more of: a font type attribute value; a font size attribute value; a rotation attribute value.

4. The computer implemented method of claim 1, further including calculating a bounding box for the first text area based on the expanded bounding boxes of the glyphs in the first distinct group of glyphs.

5. The computer implemented method of claim 1, wherein calculating the expanded bounding box for a first glyph includes:
    calculating the initial bounding box for the first glyph based on the PDF text data; and
    applying an expansion factor to the initial bounding box for the first glyph to calculate the expanded bounding box for the first glyph.

6. The computer implemented method of claim 5, wherein applying an expansion factor to the initial bounding box for the first glyph includes applying a horizontal expansion factor to horizontally expand the initial bounding box for the first glyph and applying a vertical expansion factor to vertically expand the initial bounding box for the first glyph, the horizontal expansion factor being different to the vertical expansion factor.

7. The computer implemented method of claim 5, wherein the initial bounding box for the first glyph is a glyph space bounding box and calculating the expanded bounding box for the first glyph further includes transforming the glyph space bounding box to a document space bounding box, the document space bounding box being in a coordinate space of a document the first glyph is to be rendered in.

8. The computer implemented method of claim 5, wherein the expanded bounding box for the first glyph includes data from which a set of expanded bounding box coordinates can be determined, the set of expanded bounding box coordinates including a minimum x coordinate, a maximum x coordinate, a minimum y coordinate, and a maximum y coordinate.

9. The computer implemented method of claim 8, wherein the minimum x coordinate and maximum x coordinate are based on a glyph width defined in the PDF text data and associated with the first glyph.

10. The computer implemented method of claim 8, wherein the minimum y coordinate and maximum y coordinate are based on a glyph y coordinate and a glyph height, the glyph y coordinate being calculated based on a bounding box y value and a descent value that are defined in the PDF text data and associated with the first glyph.

11. The computer implemented method of claim 10, wherein the glyph height is based on a CapHeight value defined in the PDF text data and associated with the first glyph.

12. The computer implemented method of claim 10, wherein the glyph height is based on a bounding box height value defined in the PDF text data and associated with the first glyph and the descent value defined in the PDF text data and associated with the first glyph.

13. The computer implemented method of claim 1, further including:
   determining that the first text area and the second text area are compatible;
   in response to determining that the first text area and the second text area are compatible, determining that the first text area fully contains the second text area; and
   in response to determining that the first text area fully contains the second text area, merging the first and second text areas into a single text area by:
      associating the glyphs associated with the first text area with the single text area; and
      associating the glyphs associated with the second text area with the single text area.

14. The computer implemented method of claim 13, wherein the first text area and the second text area are determined to be compatible if they are associated with glyphs that have a same rotation.

15. The computer implemented method of claim 13, further including:
   determining a particular attribute for which glyphs associated with the single text area have different values;
   generating a common value for the particular attribute; and
   associating the common value with the glyphs associated with the single text area.

16. The computer implemented method of claim 15, wherein
   the particular attribute is a font size attribute; and
   generating a common value includes determining a font size based on the font sizes of the glyphs associated with the single text area.

17. The computer implemented method of claim 15, wherein
   the particular attribute is a font type attribute; and
   generating a common value includes determining a font type based on the font types of the glyphs associated with the single text area.

18. A computer processing system including:
   a processing unit;
   a communication interface; and
   non-transitory computer-readable storage medium storing instructions, which when executed by the processing unit, cause the processing unit to:
      access portable document format (PDF) text data, the PDF text data defining a plurality of glyphs by way of data specifying glyph attribute values, the data including for each glyph of the plurality of glyphs at least: size data defining a size of the glyph, and font type data defining a font type of the glyph;
      sort the plurality of glyphs into a plurality of glyph sets, wherein sorting the plurality of glyphs into the plurality of glyph sets includes:
         associating a first subset of glyphs from the plurality of glyphs with a first glyph set, wherein the first glyph set has an associated first set of grouping attribute values and wherein the association of the first subset of glyphs with the first glyph set is based on the glyph attribute values of the first subset of glyphs corresponding to the first set of grouping attribute values; and
         associating a second subset of glyphs from the plurality of glyphs with a second glyph set, wherein the second glyph set has an associated second set of grouping attribute values and wherein the association of the second subset of glyphs with the second glyph set is based on a determination by the processing unit that the glyph attribute values in the second subset of glyphs correspond to the second set of grouping attribute values, the second set of grouping attribute values being different to the first set of grouping attribute values;
         wherein the first set of grouping attribute values and the second set of grouping attribute values each include glyph size grouping data, and font type grouping data and wherein both the glyph size grouping data and the font type grouping data are utilised in the determinations that the glyph attribute values in the first and second subset of glyphs correspond to the first and second set of grouping attribute values respectively;
      calculate, for each glyph, an expanded bounding box, wherein a different expanded bounding box is calculated for each glyph by manipulating an initial bounding box of each glyph;
      process the first glyph set to determine one or more text areas, each text area being associated with one or more glyphs, and wherein processing the first glyph set to determine the one or more text areas includes:
         identifying a first distinct groups of glyphs from the first glyph set, the first distinct group of glyphs including one or more glyphs from the first glyph set which have collectively overlapping expanded bounding boxes;
         associating each glyph in the first distinct group of glyphs with a first text area;
         identifying a second distinct group of glyphs from the first glyph set, the second distinct group of glyphs including one or more glyphs from the first glyph set which are not in the first distinct group of glyphs and which have collectively overlapping expanded bounding boxes; and
         associating each glyph in the second distinct group of glyphs with a second text area.

19. A non-transitory storage medium storing instructions executable by a processing unit to cause the processing unit to:
   access portable document format (PDF) text data, the PDF text data defining a plurality of glyphs by way of data specifying glyph attribute values;

sort the plurality of glyphs into a plurality of glyph sets, wherein sorting the plurality of glyphs into the plurality of glyph sets includes:

associating a first subset of glyphs from the plurality of glyphs with a first glyph set, wherein the first glyph set has an associated first set of grouping attribute valued and wherein the association of the first subject of glyphs with the first glyph set is based on the glyph attribute values of the first subset of glyphs corresponding to the first set of grouping attribute values; and associating a second subset of glyphs from the plurality of glyphs with a second glyph set, wherein the second glyph set has an associated second set of grouping attribute values and wherein the association of the second subset of glyphs with the second glyph set is based on a determination by the processing unit that the glyph attribute values in the second subset of glyphs correspond to the second set of grouping attribute values, the second set of grouping attribute values being different to the first set of grouping attribute values;

calculate, for each glyph, an expanded bounding box, wherein a different expanded bounding box is calculated for each glyph by manipulating an initial bounding box of each glyph;

process the first more glyph set to determine one or more text areas, each text area being associated with one or more glyphs, and wherein processing the first glyph set to determine the one or more text areas includes:

identifying a first distinct group of glyphs from the first glyph set, the first distinct group of glyphs including one or more glyphs from the first glyph set which have collectively overlapping expanded bounding boxes;

associating each glyph in the first distinct group of glyphs with a first text area;

identifying a second distinct group of glyphs from the first glyph set, the second distinct group of glyphs including one or more glyphs from the first glyph set which are not in the first distinct group of glyphs and which have collectively overlapping expanded bounding boxes; and associating each glyph in the second distinct group of glyphs with a second text area.

* * * * *